(12) United States Patent
Bloch et al.

(10) Patent No.: US 10,695,916 B2
(45) Date of Patent: Jun. 30, 2020

(54) END EFFECTORS HAVING RECONFIGURABLE VACUUM HEADS

(71) Applicant: The Boeing Company, Chicago, IL (US)

(72) Inventors: Daniel David Bloch, Saint Peters, MO (US); Zachary Green, Edwardsville, IL (US); Eric E. Moyes, Desoto, MO (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 16/028,196

(22) Filed: Jul. 5, 2018

(65) Prior Publication Data

US 2020/0009744 A1 Jan. 9, 2020

(51) Int. Cl.
*B25J 15/06* (2006.01)
*B25J 9/02* (2006.01)
(Continued)

(52) U.S. Cl.
CPC ............ *B25J 15/0691* (2013.01); *B25J 9/023* (2013.01); *B25J 9/04* (2013.01); *B25J 15/0052* (2013.01); *B29C 70/38* (2013.01)

(58) Field of Classification Search
CPC ................ B25J 15/0052; B25J 15/0616; B25J 15/0683; B25J 15/0691; B25J 9/023;
(Continued)

(56) References Cited

U.S. PATENT DOCUMENTS 6,502,877 B2 * 1/2003 Schick ..................... B25J 15/06
 294/185
6,641,131 B2 * 11/2003 Stohr ................... B65H 3/0883
 271/107

(Continued)

FOREIGN PATENT DOCUMENTS

DE 102006017763 A1 * 10/2007 ........... B65G 49/061
EP 2647463 10/2013
EP 2845701 3/2015

OTHER PUBLICATIONS

European Patent Office, "Extended European Search Report," issued in connection with European Patent Application No. 18163928.7, dated Sep. 20, 2018, 9 pages.

*Primary Examiner* — Dean J Kramer
(74) *Attorney, Agent, or Firm* — Hanley, Flight & Zimmerman, LLC

(57) ABSTRACT

End effectors having reconfigurable vacuum heads for picking up thermoplastic parts of thermoplastic composite laminated articles are described. An example end effector is to be coupled to a robot. The end effector includes a first vacuum head having a first vacuum surface. The first vacuum head is to pick up a thermoplastic part in response to a first vacuum force applied at the first vacuum surface. The end effector further includes a second vacuum head having a second vacuum surface. The second vacuum head is to assist the first vacuum head in picking up the thermoplastic part in response to a second vacuum force applied at the second vacuum surface. The end effector further includes an arm to (Continued)

adjustably position the second vacuum head relative to the first vacuum head. The second vacuum head is coupled to the arm, and the arm is movable relative to the first vacuum head.

27 Claims, 15 Drawing Sheets

(51) Int. Cl.
*B29C 70/38* (2006.01)
*B25J 9/04* (2006.01)
*B25J 15/00* (2006.01)

(58) Field of Classification Search
CPC ........ B25J 9/04; B66C 1/0237; B66C 1/0243; B29C 70/38
USPC .................................................. 294/65, 188
See application file for complete search history.

(56) References Cited

U.S. PATENT DOCUMENTS

| | | | | |
|---|---|---|---|---|
| 7,611,180 B1* | 11/2009 | Fisher | .................. | B25J 15/0052 |
| | | | | 294/65 |
| 7,798,546 B2* | 9/2010 | Kniss | .................. | B25J 15/0052 |
| | | | | 294/65 |
| 8,684,418 B2* | 4/2014 | Lin | ...................... | B25J 15/0061 |
| | | | | 269/21 |
| 8,857,877 B2* | 10/2014 | Lin | ...................... | B25J 15/0061 |
| | | | | 269/71 |
| 9,010,827 B2* | 4/2015 | Regan | .................. | B25J 15/0675 |
| | | | | 294/188 |
| 9,199,375 B2* | 12/2015 | Miyoshi | .................. | B25J 15/00 |
| 9,498,887 B1* | 11/2016 | Zevenbergen | ....... | B25J 15/0616 |
| 9,969,131 B2* | 5/2018 | Samak Sangari | ...... | B25J 9/1697 |
| 2016/0089780 A1* | 3/2016 | Marttinen | .................. | B25J 9/02 |
| | | | | 74/490.03 |
| 2017/0057100 A1* | 3/2017 | Shaw | .................. | B25J 15/0616 |

* cited by examiner

END EFFECTORS HAVING RECONFIGURABLE VACUUM HEADS

FIELD OF THE DISCLOSURE

This disclosure relates generally to end effectors used to fabricate thermoplastic composite laminated articles and, more specifically, to end effectors having reconfigurable vacuum heads for picking up thermoplastic parts of thermoplastic composite laminated articles.

BACKGROUND

Conventional methods of assembling thermoplastic composite laminated articles and/or thermoplastic composite layups require a substantial degree of manual labor and/or human involvement in conjunction with performing various aspects, steps and/or stages of the assembly process. For example, such conventional methods commonly require that one or more thermoplastic part(s) (e.g., one or more thermoplastic prepreg part(s)) to be incorporated into a thermoplastic composite laminated article be picked up, moved, placed, stacked and/or laid up manually prior to such individual thermoplastic parts being welded (e.g., tack welded) to one another in connection with forming the thermoplastic composite laminated article. Human involvement in the picking up, placing, stacking and/or laying up aspects of such conventional methods limits the accuracy, efficiency, and repeatability of the assembly process

SUMMARY

End effectors having reconfigurable vacuum heads for picking up thermoplastic parts of thermoplastic composite laminated articles are disclosed. In some examples, an end effector to be coupled to a robot is disclosed. In some disclosed examples, the end effector comprises a first vacuum head including a first vacuum surface. In some disclosed examples, the first vacuum head is to pick up a thermoplastic part in response to a first vacuum force applied at the first vacuum surface. In some disclosed examples, the end effector further comprises a second vacuum head including a second vacuum surface. In some disclosed examples, the second vacuum head is to assist the first vacuum head in picking up the thermoplastic part in response to a second vacuum force applied at the second vacuum surface. In some disclosed examples, the end effector further comprises an arm to adjustably position the second vacuum head relative to the first vacuum head. In some disclosed examples, the second vacuum head is coupled to the arm. In some disclosed examples, the arm is movable relative to the first vacuum head.

In some examples, a method for picking up a thermoplastic part with an end effector coupled to a robot is disclosed. In some disclosed examples of the method, the end effector includes a first vacuum head and a second vacuum head. In some disclosed examples of the method, the second vacuum head is adjustably positionable relative to the first vacuum head via an arm. In some disclosed examples, the method comprises positioning the second vacuum head relative to the first vacuum head based on a property of the thermoplastic part. In some disclosed examples, the property is at least one of a size, a shape, or a porosity of the thermoplastic part. In some disclosed examples, the method further comprises positioning a first vacuum surface of the first vacuum head and a second vacuum surface of the second vacuum head against the thermoplastic part. In some disclosed examples, the method further comprises applying a first vacuum force at the first vacuum surface and a second vacuum force at the second vacuum surface. In some disclosed examples, the first and second vacuum forces respectively cause the first and second vacuum heads to pick up the thermoplastic part.

In some examples, a method for forming a thermoplastic composite layup with an end effector coupled to a robot is disclosed. In some disclosed examples of the method, the end effector includes a first vacuum head and a second vacuum head. In some disclosed examples of the method, the second vacuum head is adjustably positionable relative to the first vacuum head via an arm. In some disclosed examples, the method comprises positioning the second vacuum head at a first position relative to the first vacuum head based on a first property of a first thermoplastic part of the thermoplastic composite layup, the first property being at least one of a size, a shape, or a porosity of the first thermoplastic part. In some disclosed examples, the method comprises positioning a first vacuum surface of the first vacuum head and a second vacuum surface of the second vacuum head against the first thermoplastic part. In some disclosed examples, the method comprises picking up the first thermoplastic part with the first and second vacuum heads in response to vacuum forces applied at the first and second vacuum heads. In some disclosed examples, the method comprises placing the first thermoplastic part. In some disclosed examples, the method comprises positioning the second vacuum head at a second position relative to the first vacuum head based on a second property of a second thermoplastic part of the thermoplastic composite layup, the second property being at least one of a size, a shape, or a porosity of the second thermoplastic part, the second position being different from the first position. In some disclosed examples, the method comprises positioning the first vacuum surface of the first vacuum head and the second vacuum surface of the second vacuum head against the second thermoplastic part. In some disclosed examples, the method comprises picking up the second thermoplastic part with the first and second vacuum heads in response to vacuum forces applied at the first and second vacuum heads. In some disclosed examples, the method comprises placing the second thermoplastic part against the first thermoplastic part.

Figure 1:
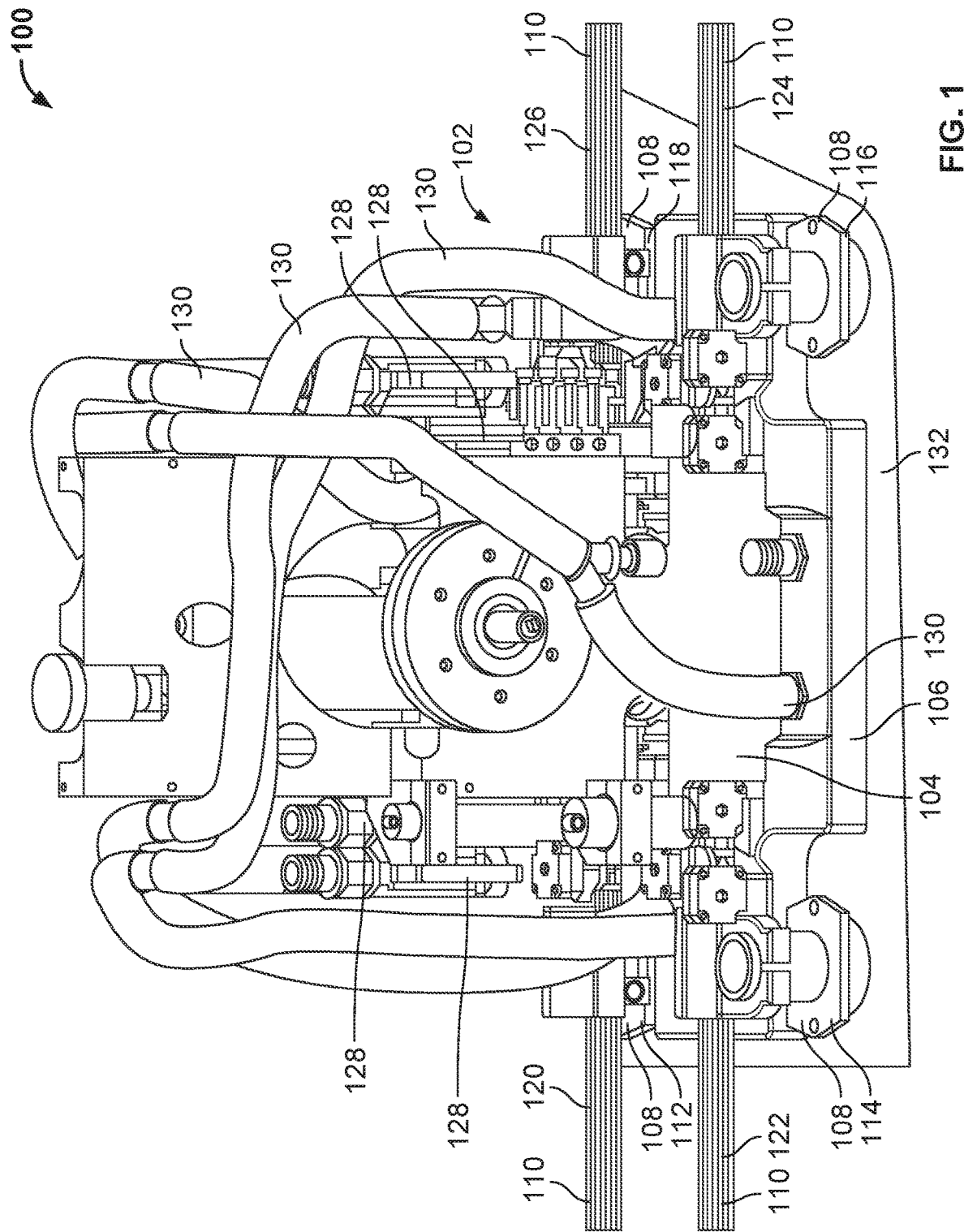
FIG. 1 is a first perspective view of an example end effector constructed in accordance with the teachings of this disclosure and shown in a first example configuration.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

As used herein, the term "thermoplastic part" refers to a thermoplastic material (e.g., one or more sheets, plies, or layers of thermoplastic material) to be incorporated into a thermoplastic composite laminated article. A thermoplastic part can be, for example, one or more sheets of fiber pre-impregnated with thermoplastic resin (e.g., prepreg). The fiber can be formed, for example, from carbon, fiberglass, or Kevlar. The fiber can be unidirectional, or can alternatively be a multidirectional weave or fabric. As used herein, the term "thermoplastic composite laminated article" refers generally to any thermoplastic article including at least two thermoplastic parts that have been welded (e.g., tack welded) to one another to form the thermoplastic composite laminated article. Further processing, for example through the application of heat and pressure, of the thermoplastic composite laminated article creates a thermoplastic composite structure. The end use of the thermoplastic composite structure determines the specific configuration (e.g., number of sheets, size and shape of sheets, or relative orientation of adjacent sheets) of the thermoplastic parts in the thermoplastic composite laminated article.

As discussed above, conventional methods of assembling thermoplastic composite laminated articles commonly require that one or more thermoplastic part(s) (e.g., one or more thermoplastic prepreg part(s)) to be incorporated into a thermoplastic composite laminated article be picked up, moved, placed, stacked and/or laid up manually prior to such individual thermoplastic parts being welded to one another to form the thermoplastic composite laminated article. Human involvement in the picking up, placing, stacking and/or laying up aspects of such conventional methods limits the accuracy, efficiency, and repeatability of the assembly process. Automated methods utilizing a robotic end effector having a vacuum head configured to pick up, place, stack and/or lay up one or more thermoplastic part(s) of a thermoplastic composite laminated article are described in U.S. patent application Ser. No. 15/484,721 entitled "Multifunction End Effector Apparatus and Methods for Assembling Thermoplastic Composite Articles" filed on Apr. 11, 2017. Such automated methods greatly improve the accuracy, efficiency, and repeatability of the assembly process.

Part properties of respective ones of the thermoplastic parts of a thermoplastic composite laminated article can differ and/or vary relative to one another. For example, a first thermoplastic part to be incorporated into a thermoplastic composite laminated article can have a size, a shape and/or a porosity or permeability that differ(s) from a size, a shape and/or a porosity or permeability of a second thermoplastic part to be incorporated into the thermoplastic composite laminated article. In such an example, the first thermoplastic part can be a first ply of thermoplastic material, and the second thermoplastic part can be a second ply of thermoplastic material to be stacked (e.g., laid up or laminated) on the first ply of thermoplastic material.

Differences and/or variances among corresponding part properties of the respective ones of the thermoplastic parts to be incorporated into a thermoplastic composite laminated article can be substantial. For example, the size (e.g., length, width, surface area, etc.) of a first thermoplastic part to be incorporated into a thermoplastic composite laminated article can differ from the size of a second thermoplastic part to be incorporated into the thermoplastic composite laminated article by a factor of five (5x) or more. A smaller-sized thermoplastic part can be just a few inches long, while a larger-sized thermoplastic part can be several feet long. Similar differences and/or variances can exist with respect to the corresponding shapes and/or porosities of the respective ones of the thermoplastic parts.

Several inefficiencies and/or disadvantages arise in connection with implementing an end effector having a single, fixed-frame vacuum head configured and/or structured to accommodate the wide-ranging differences and/or variances among the corresponding part properties of the respective ones of the thermoplastic parts to be incorporated into one or more thermoplastic composite laminated article(s). For example, the footprint of the vacuum surface of the fixed-frame vacuum head must be large enough to facilitate picking up the very largest thermoplastic part to be incorporated into the thermoplastic composite laminated article(s). In some such examples, the required footprint can necessitate the use of an oversized (e.g., in terms of length and/or width and/or weight) end effector to support the fixed-frame vacuum head, and the larger end effector can in turn necessitate the use of a larger robotic arm to support and/or move the end effector and its fixed-frame vacuum head. As another example, the vacuum generator(s) of the fixed-frame vacuum head must be capable of generating vacuum force(s) (e.g., vacuum flow(s) or suction(s)) that are powerful enough to pick up the least dense and/or most porous thermoplastic part to be incorporated into the thermoplastic composite laminated article(s). Moreover, such vacuum force(s) must be generated and/or distributed over the substantial entirety of the vacuum surface of the fixed-frame vacuum head to accommodate picking up different-sized and/or different-shaped ones of the thermoplastic parts to be incorporated into the thermoplastic composite laminated article(s). In such examples, substantial portions of the vacuum force(s) and/or substantial areas of the vacuum surface of the fixed-frame vacuum head will be of little to no use when the fixed-frame vacuum head is picking up a smaller-sized thermoplastic part.

Example end effectors disclosed herein include reconfigurable vacuum heads for picking up thermoplastic parts of thermoplastic composite laminated articles. More specifically, the disclosed end effectors include a primary vacuum head, one or more secondary vacuum head(s), and one or more adjustable arm(s) corresponding in number to the number of secondary vacuum heads. Each one of the secondary vacuum heads is coupled (e.g., movably coupled) to a corresponding one of the adjustable arms. Each one of the adjustable arms is coupled (e.g., movably coupled) to the primary vacuum head and/or to a frame of the end effector. Each one of the secondary vacuum heads can advantageously be positioned and/or moved (e.g., via its corresponding one of the adjustable arms) relative to the primary vacuum head and/or, in examples including more than one secondary vacuum head, relative to one another. The position(s) and/or movement(s) of the secondary vacuum head(s) relative to the primary vacuum head is/are based on at least one property (e.g., a size, a shape, a porosity, etc.) of a thermoplastic part to be picked up by the primary vacuum head and the secondary vacuum head(s) of the end effector. The reconfigurable vacuum heads of the disclosed end effectors advantageously reduce (e.g., eliminate) the above-described inefficiencies that can be associated with implementing an end effector having a single, fixed-frame vacuum head.

As used herein, the terms "primary" and "secondary" are merely descriptive, and do not necessarily carry any functional connotations. For example, while any secondary vacuum head of an end effector can assist a primary vacuum head of the end effector in picking up a thermoplastic part, the primary vacuum head can alternatively operate to pick up a thermoplastic part independently from any secondary vacuum head, and vice-versa. As another example, a vacuum force generated and/or applied by a primary vacuum head of the end effector can be greater than, equal to, or less than a vacuum force generated and/or applied by any secondary vacuum head of the end effector, and can be generated and/or applied independently from any vacuum force generated and/or applied by any secondary vacuum head of the end effector.

Figure 2:
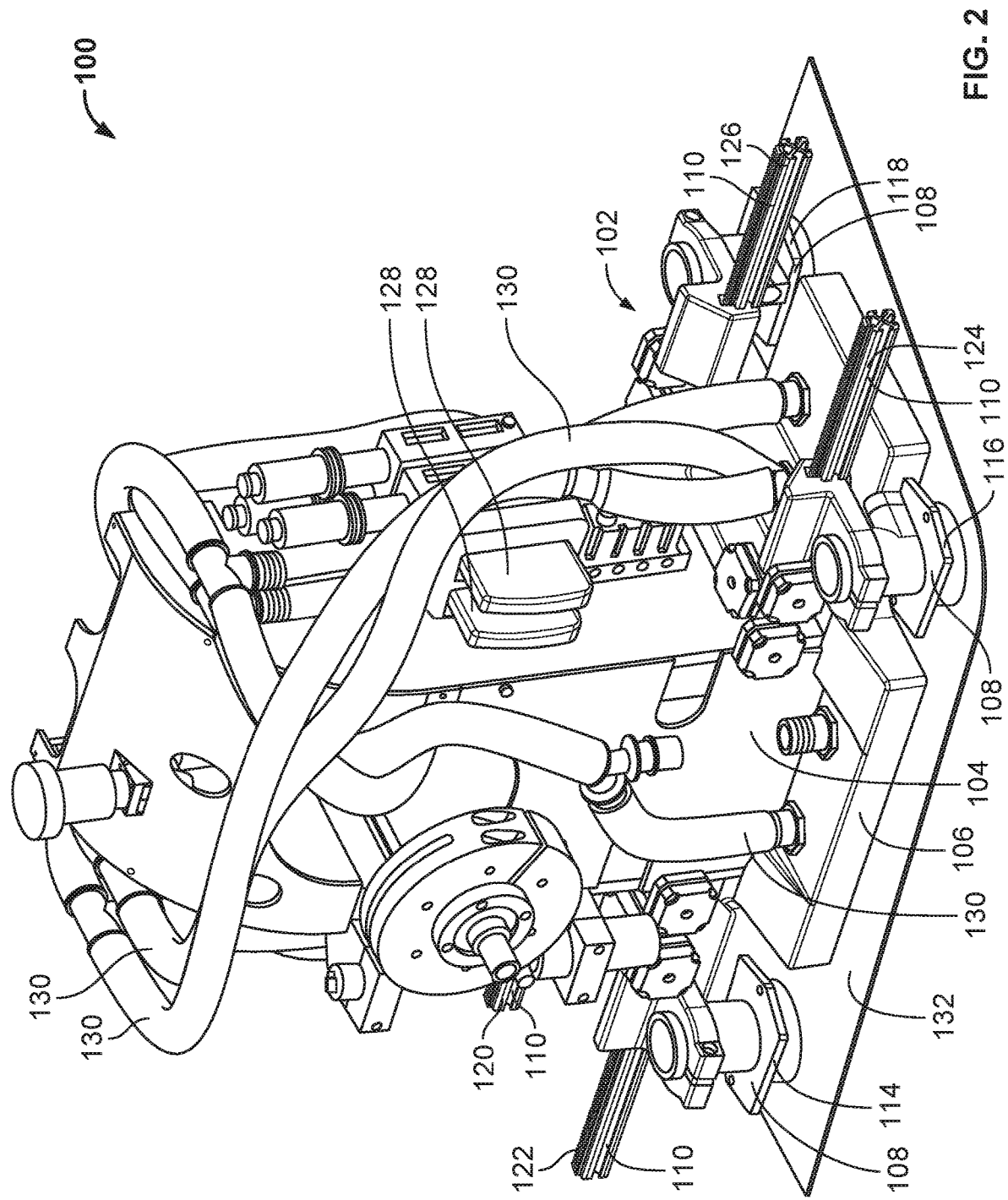
FIG. 2 is a second perspective view of the example end effector of FIG. 1 shown in the first example configuration of FIG. 1.
Figure 3:
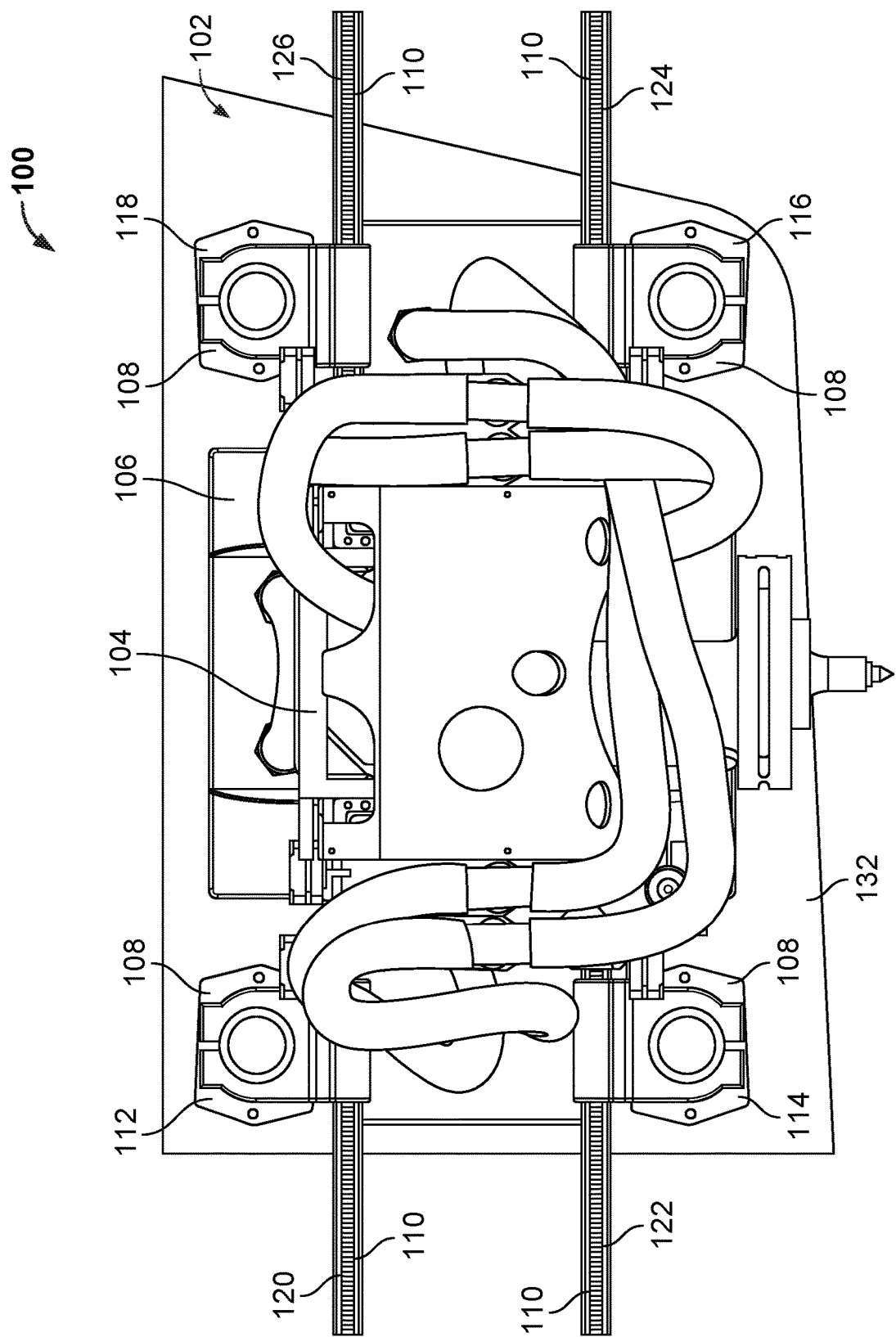
FIG. 3 is a plan view of the example end effector of FIGS. 1 and 2 shown in the first example configuration of FIGS. 1 and 2.
Figure 4:
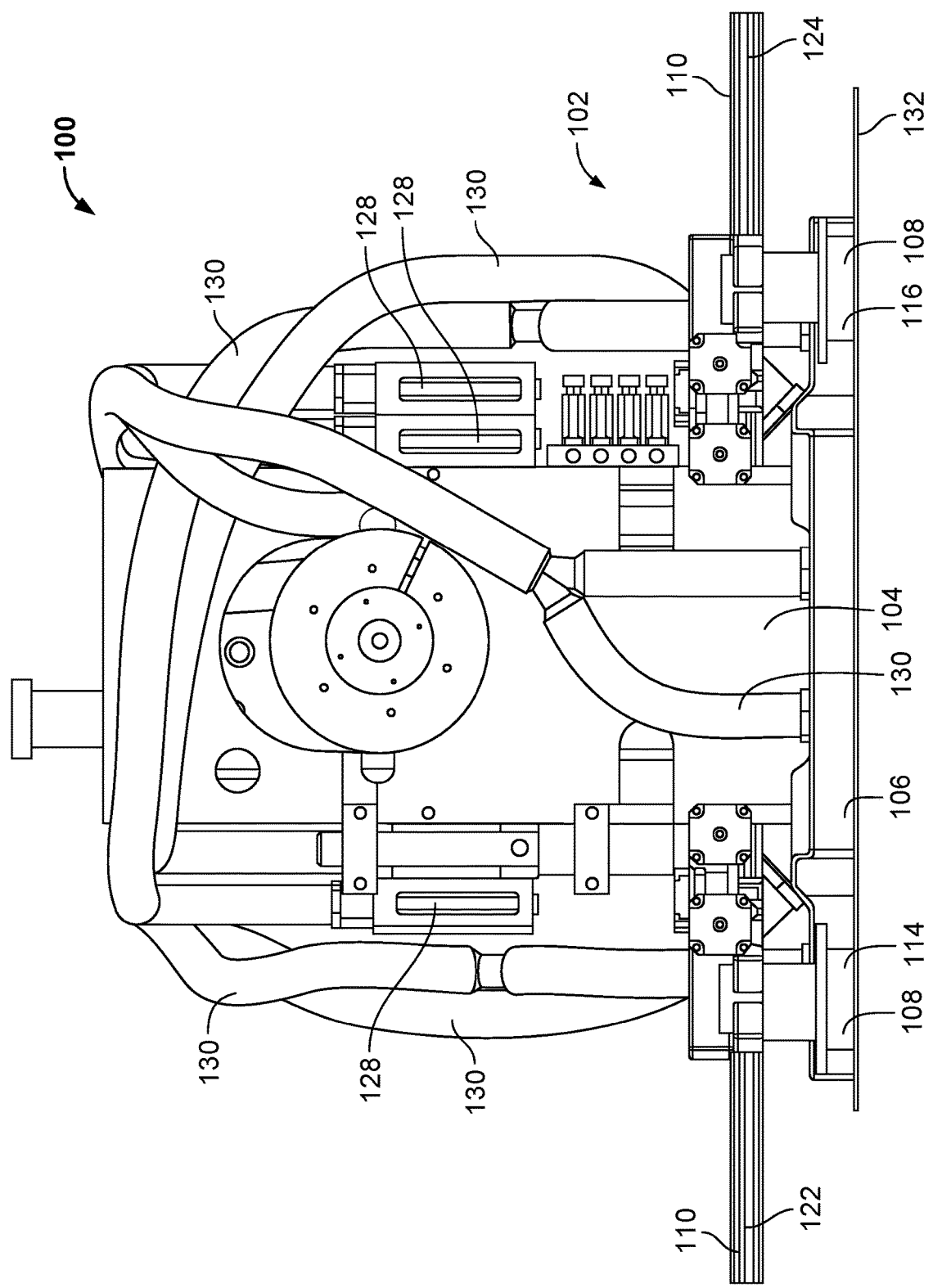
FIG. 4 is a side view of the example end effector of FIGS. 1-3 shown in the first example configuration of FIGS. 1-3.
Figure 5:
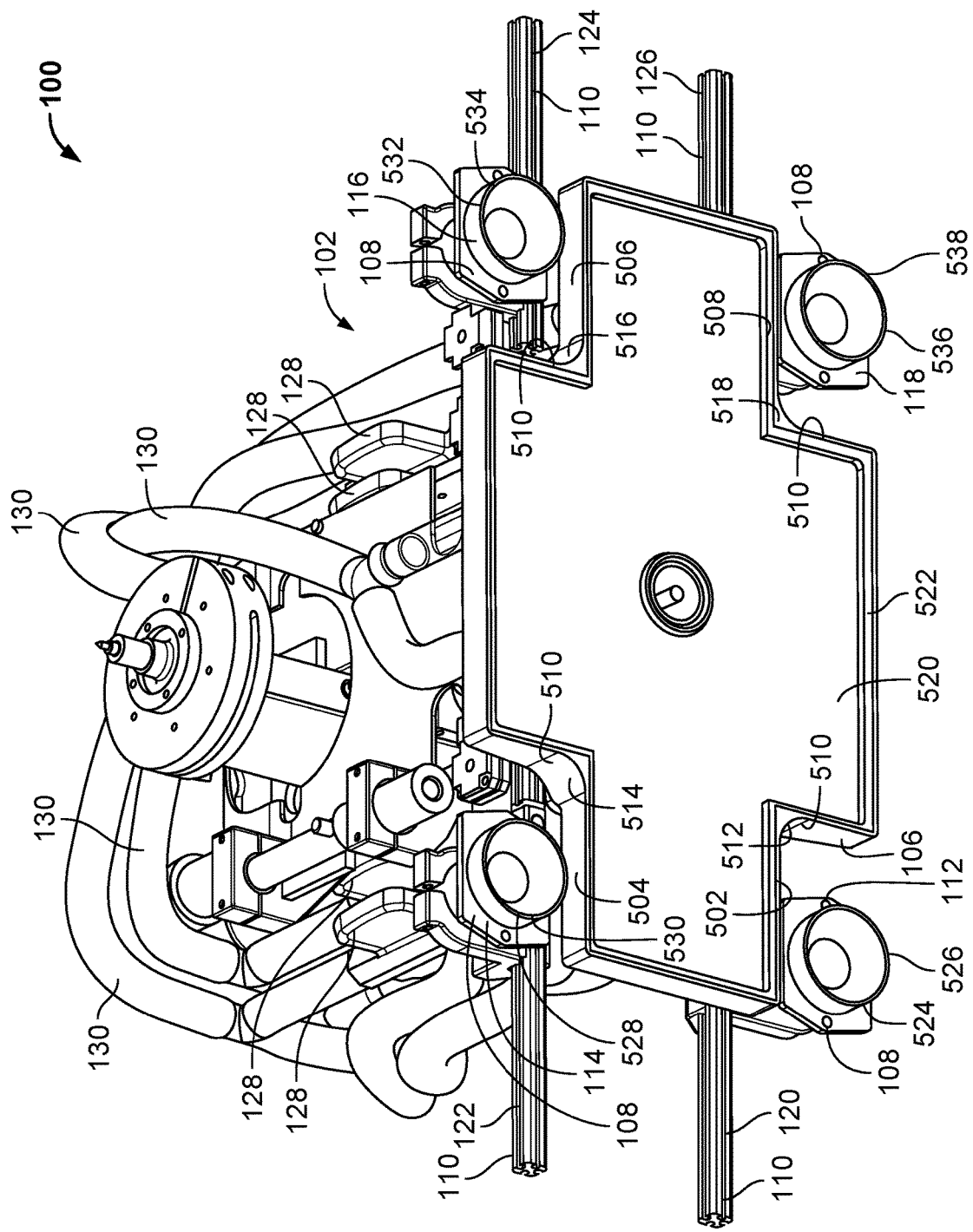
FIG. 5 is a third perspective view of the example end effector of FIGS. 1-4 shown in the first example configuration of FIGS. 1-4.
Figure 6:
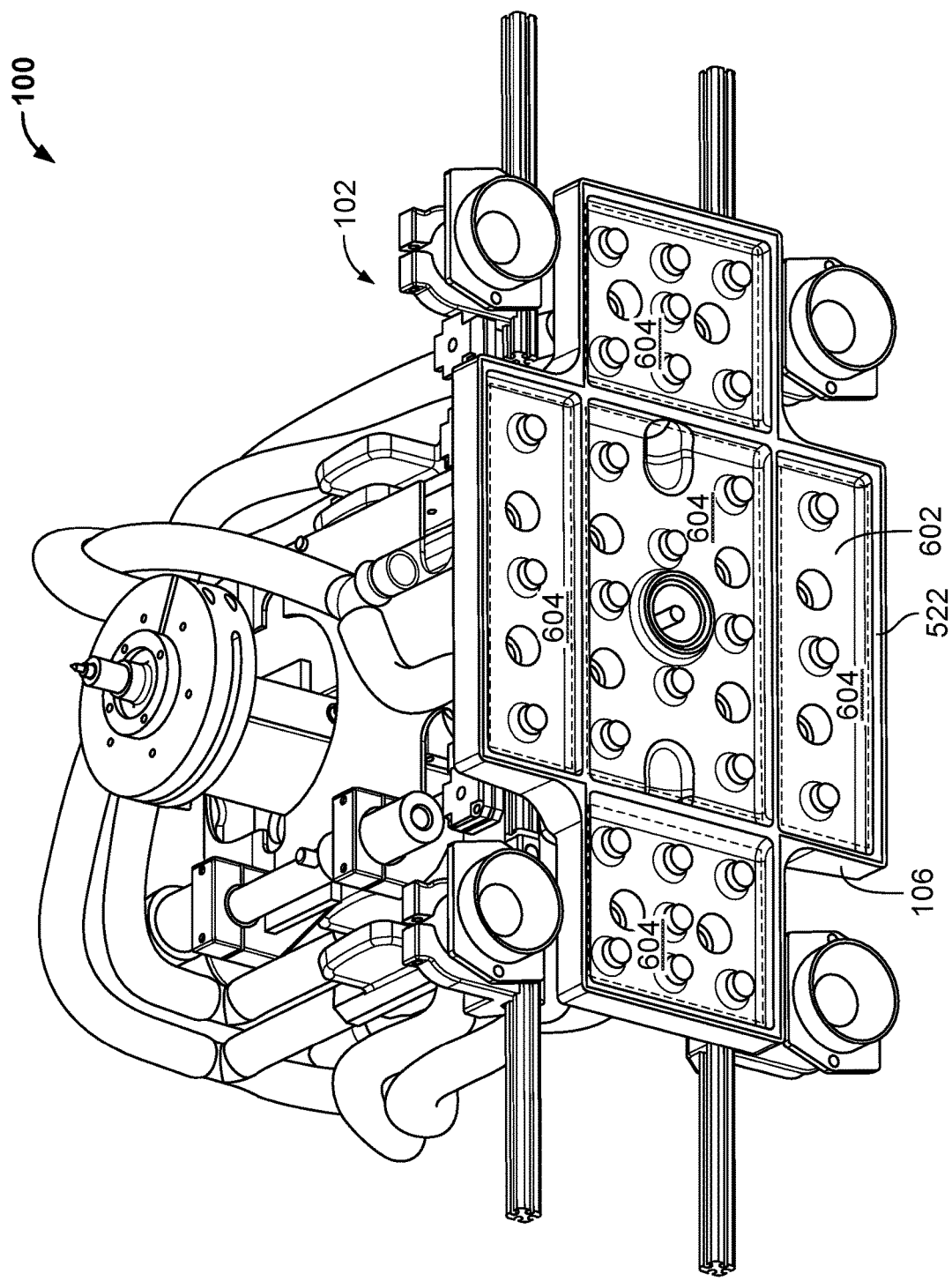
FIG. 6 is a fourth perspective view of the example end effector of FIGS. 1-5 shown in the first example configuration of FIGS. 1-5, and with the example primary vacuum surface shown in FIG. 5 omitted.

FIG. 1 is a first perspective view of an example end effector 100 constructed in accordance with the teachings of this disclosure and shown in a first example configuration 102. FIG. 2 is a second perspective view of the example end effector 100 of FIG. 1 shown in the first example configuration 102 of FIG. 1. FIG. 3 is a plan view of the example end effector 100 of FIGS. 1 and 2 shown in the first example configuration 102 of FIGS. 1 and 2. FIG. 4 is a side view of the example end effector 100 of FIGS. 1-3 shown in the first example configuration 102 of FIGS. 1-3. FIG. 5 is a third perspective view of the example end effector 100 of FIGS. 1-4 shown in the first example configuration 102 of FIGS. 1-4. FIG. 6 is a fourth perspective view of the example end effector 100 of FIGS. 1-5 shown in the first example configuration 102 of FIGS. 1-5, and with the example primary vacuum surface 520 shown in FIG. 5 omitted.

The end effector 100 of FIGS. 1-6 includes an example frame 104, an example primary vacuum head 106, example secondary vacuum heads 108, and example adjustable arms 110. In the illustrated example of FIGS. 1-6, the primary vacuum head 106 is coupled (e.g., fixedly or rigidly coupled) to the frame 104 of the end effector 100, and each one of the secondary vacuum heads 108 is movably coupled to the frame 104 and/or to the primary vacuum head 106 of the end effector 100 via a corresponding one of the adjustable arms 110. As further described below, each one of the secondary vacuum heads 108 can be moved via a corresponding one of the adjustable arms 110 from a retracted position (e.g., as shown in the first configuration 102 of FIGS. 1-6) to a myriad of different deployed positions to facilitate picking up various thermoplastic parts having different and wide-ranging properties (e.g., different shapes, different sizes, different porosities, etc.).

The end effector 100 of FIGS. 1-6 can be coupled to a robot. For example, the frame 104 of the end effector 100 can be coupled to a movable frame and/or axis of a robot such that movements of the frame and/or axis of the robot are transferred and/or conveyed to the frame 104 of the end effector 100 and/or, more generally to the end effector 100 as a whole. In some examples, the robot can be a jointed arm six-axis robot capable of moving (e.g., translating, rotating, etc.) the end effector 100 of FIGS. 1-6 into various positions and/or locations within an environment of use. In other examples, the robot can be of a different type, structure and/or configuration capable of moving the end effector 100 of FIGS. 1-6 into various positions and/or locations within an environment of use.

In the illustrated example of FIGS. 1-6, the secondary vacuum heads 108 of the end effector 100 include a first example secondary vacuum head 112, a second example secondary vacuum head 114, a third example secondary vacuum head 116, and a fourth example secondary vacuum head 118. The number of adjustable arms 110 of the end effector 100 is equal to the number of secondary vacuum heads 108 of the end effector 100. More specifically, the adjustable arms 110 of the end effector 100 of FIGS. 1-6 include a first example adjustable arm 120, a second example adjustable arm 122, a third example adjustable arm 124, and a fourth example adjustable arm 126. As further described below, the first adjustable arm 120 movably couples the first secondary vacuum head 112 to the primary vacuum head 106, the second adjustable arm 122 movably couples the second secondary vacuum head 114 to the primary vacuum head 106, the third adjustable arm 124 movably couples the third secondary vacuum head 116 to the primary vacuum head 106, and the fourth adjustable arm 126 movably couples the fourth secondary vacuum head 118 to the primary vacuum head 106. In other examples, the end effector 100 can include a different number (e.g., 1, 2, 3, 6, 8, etc.) of secondary vacuum heads 108 and a corresponding different number of adjustable arms 110 relative to the four secondary vacuum heads 108 and the four adjustable arms 110 shown in FIGS. 1-6.

In the illustrated example of FIGS. 1-6, respective ones of the secondary vacuum heads 108 of the end effector 100 are shown peripherally arranged at corresponding respective retracted positions about the primary vacuum head 106 of the end effector 100. More specifically, the first secondary vacuum head 112 of FIGS. 1-6 is shown in a retracted position located at a first example peripheral area 502 of the primary vacuum head 106, the second secondary vacuum head 114 of FIGS. 1-6 is shown in a retracted position located at a second example peripheral area 504 of the primary vacuum head 106, the third secondary vacuum head 116 of FIGS. 1-6 is shown in a retracted position located at a third example peripheral area 506 of the primary vacuum head 106, and the fourth secondary vacuum head 118 of FIGS. 1-6 is shown in a retracted position located at a fourth example peripheral area 508 of the primary vacuum head 106. In other examples, the arrangement and/or retracted positions of the secondary vacuum heads 108 can differ relative to the arrangement and/or retracted positions shown in FIGS. 1-6.

The primary vacuum head 106 of FIGS. 1-6 includes example recesses and/or pockets 510 (e.g., as shown in FIG. 5) formed along the periphery of the primary vacuum head 106 and corresponding in number to the number of secondary vacuum heads 108 of the end effector 100 of FIGS. 1-6. Each one of the pockets 510 is structured and/or shaped to receive and/or stow a corresponding one of the secondary vacuum heads 108 of the end effector 100 of FIGS. 1-6 when the corresponding one of the secondary vacuum heads 108 is positioned in its respective retracted position relative to the primary vacuum head 106, as shown in FIGS. 1-6, thereby minimizing the cumulative footprint of the vacuum heads (e.g., the primary vacuum head 106 in combination with the secondary vacuum heads 108) of the end effector 100 as a whole. More specifically, the primary vacuum head 106 of FIGS. 1-6 includes a first example pocket 512 located at the first peripheral area 502 of the primary vacuum head 106 and structured and/or shaped to receive and/or stow the first secondary vacuum head 112 when the first secondary vacuum head 112 is in a retracted position, a second example pocket 514 located at the second peripheral area 504 of the primary vacuum head 106 and structured and/or shaped to receive and/or stow the second secondary vacuum head 114 when the second secondary vacuum head 114 is in a retracted position, a third example pocket 516 located at the third peripheral area 506 of the primary vacuum head 106 and structured and/or shaped to receive and/or stow the third secondary vacuum head 116 when the third secondary vacuum head 116 is in a retracted position, and a fourth example pocket 518 located at the fourth peripheral area 508 of the primary vacuum head 106 and structured and/or shaped to receive and/or stow the fourth secondary vacuum head 118 when the fourth secondary vacuum head 118 is in a retracted position. In other examples, the arrangement and/or locations of the pockets 510 of the primary vacuum head 106 can differ relative to the arrangement and/or locations of the pockets 510 shown in FIGS. 1-6.

In the illustrated example of FIGS. 1-6, the primary vacuum head 106 of the end effector 100 includes an example primary vacuum surface 520 (e.g., as shown in FIG. 5) located at and/or extending across an example vacuum end 522 of the primary vacuum head 106. In some examples, the primary vacuum surface 520 of FIGS. 1-6 can be a porous plastic covering that covers an example primary vacuum area 602 (e.g., as shown in FIG. 6) of the primary vacuum head 106. The primary vacuum surface 520 of FIGS. 1-6 is structured and/or configured to selectively face toward (e.g., based on the position of the frame 104 of the end effector 100 as controlled by the robot), be positioned against, and/or be positioned in contact with a thermoplastic part to be picked up by the primary vacuum head 106 of the end effector 100. In the illustrated example of FIGS. 1-6, the primary vacuum surface 520 of the primary vacuum head 106 is substantially flat and/or planar.

The primary vacuum surface 520 and/or the primary vacuum area 602 of FIGS. 1-6 is/are operatively coupled to (e.g., in fluid communication with) one or more example primary vacuum generator(s) 128 of the end effector 100. For example, each primary vacuum generator 128 can be operatively coupled to the primary vacuum surface 520 and/or to the primary vacuum area 602 via one or more example primary fluid conduit(s) 130. Each primary vacuum generator 128 is structured and/or configured to generate a corresponding primary vacuum force (e.g., a vacuum flow or suction) to be applied at the primary vacuum surface 520 and/or at the primary vacuum area 602. The primary vacuum surface 520 of FIGS. 1-6 is structured and/or configured to pick up and/or hold one or more thermoplastic part(s), or one or more portion(s) thereof, in response to the primary vacuum force(s) applied at the primary vacuum surface 520 and/or at the primary vacuum area 602 of the primary vacuum head 106.

In some examples, the primary vacuum area 602 of the primary vacuum head 106 of FIGS. 1-6 can be segmented into a plurality of example vacuum zones 604. In such examples, respective ones of the primary vacuum forces can selectively be applied to respective ones of the vacuum zones 604. In such examples, the selective application of one or more of the primary vacuum force(s) at one or more of the vacuum zone(s) 604 of the primary vacuum area 602 enables one or more desired portion(s) of the primary vacuum surface 520 of the primary vacuum head 106 to pick up and/or hold one or more thermoplastic part(s), or one or more portion(s) thereof.

In some examples, the selective application of one or more of the primary vacuum force(s) at one or more of the vacuum zone(s) 604 of the primary vacuum area 602 is determined based on at least one property (e.g., a size, a shape, a porosity, etc.) of a thermoplastic part to be picked up and/or held by the primary vacuum surface 520 of the primary vacuum head 106. For example, a digital model identifying at least one property of a thermoplastic part can be accessed by the robot to which the end effector 100 is coupled. In such an example, the selective application of one or more of the primary vacuum force(s) at one or more of the vacuum zone(s) 604 of the primary vacuum area 602 can be determined based on the digital model of the thermoplastic part.

In the illustrated example of FIGS. 1-6, each one of the secondary vacuum heads 108 of the end effector 100 is implemented by and/or as an air amplifier. Each air amplifier includes a vacuum end having a first aperture for collecting, drawing in, and/or intaking surrounding air, and a discharge end located opposite the vacuum end and having a second aperture for discharging a flow of air (e.g., a high-velocity flow of air). A vacuum surface is accordingly formed by and/or at the vacuum end of each air amplifier. For example, the first secondary vacuum head 112 of FIGS. 1-6 includes a first example secondary vacuum surface 524 formed by a first example vacuum end 526 of the first secondary vacuum head 112, the second secondary vacuum head 114 of FIGS. 1-6 includes a second example secondary vacuum surface 528 formed by a second example vacuum end 530 of the second secondary vacuum head 114, the third secondary vacuum head 116 of FIGS. 1-6 includes a third example secondary vacuum surface 532 formed by a third example vacuum end 534 of the third secondary vacuum head 116, and the fourth secondary vacuum head 118 of FIGS. 1-6 includes a fourth example secondary vacuum surface 536 formed by a fourth example vacuum end 538 of the fourth secondary vacuum head 118.

Each one of the first, second, third and fourth secondary vacuum surfaces 524, 528, 532, 536 of FIGS. 1-6 is structured and/or configured to selectively face toward (e.g., based on the position of the frame 104 of the end effector 100 as controlled by the robot), be positioned against, and/or be positioned in contact with a thermoplastic part to be picked up by one or more of the corresponding first, second, third and fourth secondary vacuum heads 112, 114, 116, 118 of the end effector 100. In the illustrated example of FIGS. 1-6, the first, second, third and fourth secondary vacuum surfaces 524, 528, 532, 536 of the corresponding first, second, third and fourth secondary vacuum heads 112, 114, 116, 118 are substantially flat and/or planar. In some examples, the first, second, third and fourth secondary vacuum surfaces 524, 528, 532, 536 of the corresponding first, second, third and fourth secondary vacuum heads 112, 114, 116, 118 of FIGS. 1-6 are coplanar relative to one another, and/or relative to the primary vacuum surface 520 of the primary vacuum head 106 of FIGS. 1-6.

Each one of the first, second, third and fourth secondary vacuum heads 112, 114, 116, 118 of FIGS. 1-6 is operatively coupled to (e.g., in fluid communication with) a source of compressed air via a corresponding secondary fluid conduit of the end effector 100. For example, the first secondary vacuum surface 524 of FIGS. 1-6 can be operatively coupled to a source of compressed air via a first secondary fluid conduit, the second secondary vacuum surface 528 of FIGS. 1-6 can be operatively coupled to the source of compressed air via a second secondary fluid conduit, the third secondary vacuum surface 532 of FIGS. 1-6 can be operatively coupled to the source of compressed air via a third secondary fluid conduit, and the fourth secondary vacuum surface 536 of FIGS. 1-6 can be operatively coupled to the source of compressed air via a fourth secondary fluid conduit. In other examples, each one of the first, second, third and fourth secondary vacuum heads 112, 114, 116, 118 of FIGS. 1-6 can be operatively coupled to (e.g., in fluid communication with) a corresponding one of multiple sources of compressed air available to the end effector 100. In still other examples, each one of the first, second, third and fourth secondary vacuum heads 112, 114, 116, 118 of FIGS. 1-6 can be operatively coupled to (e.g., in fluid communication with) one or more of the primary vacuum generator(s) 128 and/or one or more of the primary fluid conduit(s) 130 described above.

Compressed air received at each one of the first, second, third and fourth secondary vacuum heads 112, 114, 116, 118 from the source(s) of compressed air powers the operation of the air amplifiers described above, and accordingly generates secondary vacuum forces (e.g., vacuum forces or suctions) to be applied at corresponding ones of the first, second, third and fourth secondary vacuum surfaces 524, 528, 532, 536. Each one of the first, second, third and fourth secondary vacuum surfaces 524, 528, 532, 536 of FIGS. 1-6 is structured and/or configured to pick up and/or hold one or more thermoplastic part(s), or one or more portion(s) thereof, in response to the corresponding secondary vacuum forces applied at the corresponding one of the first, second, third and fourth secondary vacuum surfaces 524, 528, 532, 536 of the first, second, third and fourth secondary vacuum heads 112, 114, 116, 118 of FIGS. 1-6. The secondary vacuum forces can be applied at the first, second, third and fourth secondary vacuum surfaces 524, 528, 532, 536 of the first, second, third and fourth secondary vacuum heads 112, 114, 116, 118 of FIGS. 1-6 independently from any application of the primary vacuum force(s) at the primary vacuum surface 520 of the primary vacuum head 106 of FIGS. 1-6, and vice-versa. In some examples, the secondary vacuum forces applied at the first, second, third and fourth secondary vacuum surfaces 524, 528, 532, 536 are high-flow vacuum forces having the capacity to enable the first, second, third and fourth secondary vacuum heads 112, 114, 116, 118 and/or, more generally, the end effector 100 of FIGS. 1-6 to pick up highly-porous thermoplastic parts.

In some examples, the selective application of one or more of the secondary vacuum force(s) at the corresponding one or more of the of the first, second, third and fourth secondary vacuum surfaces 524, 528, 532, 536 of the first, second, third and fourth secondary vacuum heads 112, 114, 116, 118 is determined based on at least one property (e.g., a size, a shape, a porosity, etc.) of a thermoplastic part to be picked up and/or held by the corresponding one or more of the of the first, second, third and fourth secondary vacuum surfaces 524, 528, 532, 536 of the first, second, third and fourth secondary vacuum heads 112, 114, 116, 118. For example, a digital model identifying at least one property of a thermoplastic part can be accessed by a computer-based controller of the robot to which the end effector 100 is coupled. In such an example, the selective application of one or more of the secondary vacuum force(s) at the corresponding one or more of the of the first, second, third and fourth secondary vacuum surfaces 524, 528, 532, 536 of the first, second, third and fourth secondary vacuum heads 112, 114, 116, 118 can be determined based on the digital model of the thermoplastic part.

In the illustrated example of FIGS. 1-4, the primary vacuum surface 520 of the primary vacuum head 106 and the first, second, third and fourth secondary vacuum surfaces 524, 528, 532, 536 of the first, second, third and fourth secondary vacuum heads 112, 114, 116, 118 are positioned against and/or in contact with a first example thermoplastic part 132. Application of the above-described primary vacuum force(s) at the primary vacuum surface 520 and application of the above-described secondary vacuum forces at the first, second, third and fourth secondary vacuum surfaces 524, 528, 532, 536 causes the primary vacuum head 106 and the first, second, third and fourth secondary vacuum heads 112, 114, 116, 118, and/or, more generally, the end effector 100 to pick up the first thermoplastic part 132. Subsequent to the first thermoplastic part 132 being picked up by the above-described vacuum surfaces of the end effector 100, the robot coupled to the end effector 100 can control the end effector 100 to move the first thermoplastic part 132 from a first location at which the first thermoplastic part 132 was picked up to a second location at which the first thermoplastic part 132 is to be placed (e.g., placed in contact with another thermoplastic part).

In the illustrated example of FIGS. 1-4, the respective locations and/or positions of the first, second, third and fourth secondary vacuum heads 112, 114, 116, 118 relative to the location and/or position of the primary vacuum head 106 are based on at least one property (e.g., a size, a shape, a porosity, etc.) of the first thermoplastic part 132. For example, each one of the first, second, third and fourth secondary vacuum heads 112, 114, 116, 118 can be located in its respective retracted position shown in FIGS. 1-4 based on the size and/or the shape of the first thermoplastic part 132. In other examples, a different size and/or a different shape of a different thermoplastic part to be picked up by the end effector 100 can dictate reconfiguring and/or repositioning the first, second, third and/or fourth secondary vacuum heads 112, 114, 116, 118 of the end effector 100 from its/their respective retracted position(s) shown in FIGS. 1-6. In such examples, the size and/or shape of the first thermoplastic part 132 can be determined by the computer-based controller of the robot and/or the end effector 100 from a first digital model of the first thermoplastic part 132, and the different size and/or different shape of the different thermoplastic part can be determined by the computer-based controller of the robot and/or the end effector 100 from a second digital model of the different thermoplastic part.

Figure 7:
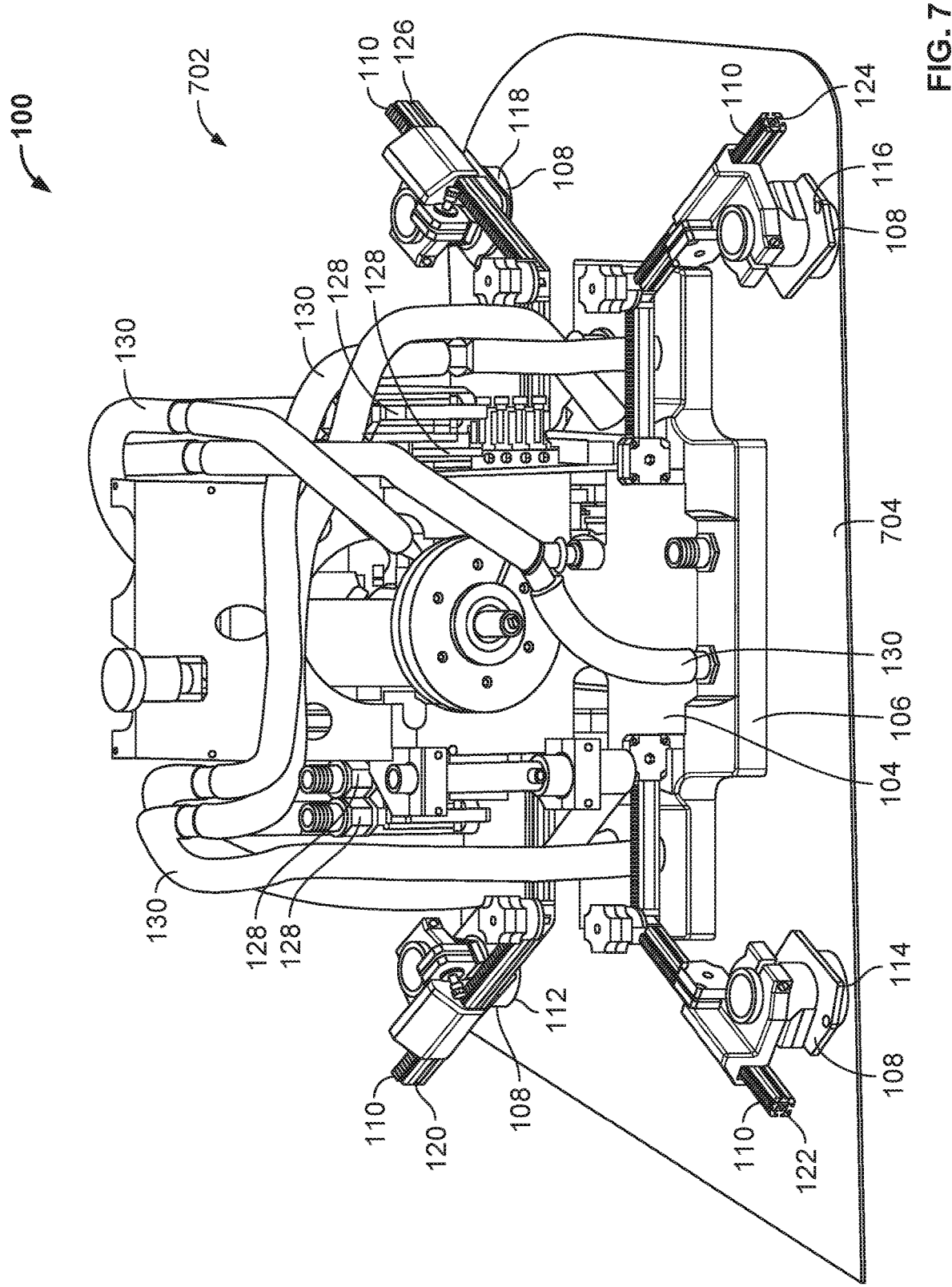
FIG. 7 is a perspective view of the example end effector of FIGS. 1-6 shown in a second example configuration.
Figure 8:
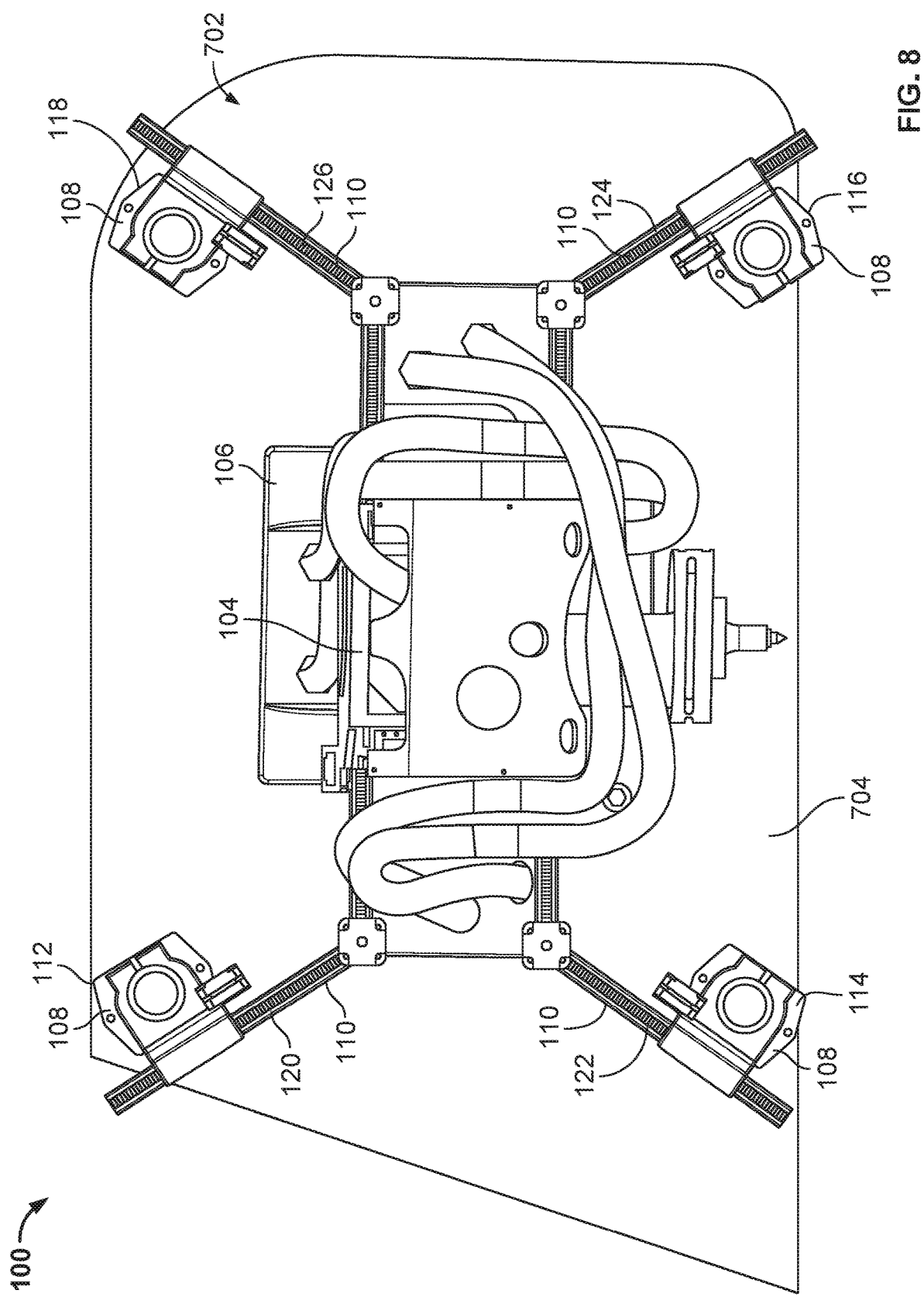
FIG. 8 is a plan view of the example end effector of FIGS. 1-7 shown in the second example configuration of FIG. 7.

FIG. 7 is a perspective view of the example end effector 100 of FIGS. 1-6 shown in a second example configuration 702. FIG. 8 is a plan view of the example end effector 100 of FIGS. 1-7 shown in the second example configuration 702 of FIG. 7. The second configuration 702 of the end effector 100 shown in FIGS. 7 and 8 differs from the first configuration 102 of the end effector 100 shown in FIGS. 1-6 in that each one of the first, second, third and fourth secondary vacuum heads 112, 114, 116, 118 of the end effector 100 has been moved via its corresponding one of the first, second, third and fourth adjustable arms 120, 122, 124, 126 of the end effector 100 from the retracted position shown in FIGS. 1-6 to the first example deployed position shown in FIGS. 7 and 8.

In the illustrated example of FIGS. 7 and 8, the primary vacuum surface 520 of the primary vacuum head 106 and the first, second, third and fourth secondary vacuum surfaces 524, 528, 532, 536 of the first, second, third and fourth secondary vacuum heads 112, 114, 116, 118 are positioned against and/or in contact with a second example thermoplastic part 704. Application of the above-described primary vacuum force(s) at the primary vacuum surface 520 and application of the above-described secondary vacuum forces at the first, second, third and fourth secondary vacuum surfaces 524, 528, 532, 536 causes the primary vacuum head 106 and the first, second, third and fourth secondary vacuum heads 112, 114, 116, 118, and/or, more generally, the end effector 100 to pick up the second thermoplastic part 704. Subsequent to the second thermoplastic part 704 being picked up by the above-described vacuum surfaces of the end effector 100, the robot coupled to the end effector 100 can control the end effector 100 to move the second thermoplastic part 704 from a first location at which the second thermoplastic part 704 was picked up to a second location at which the second thermoplastic part 704 is to be placed (e.g., placed in contact with another thermoplastic part such as the first thermoplastic part 132 of FIGS. 1-4).

In the illustrated example of FIGS. 7 and 8, the respective locations and/or positions of the first, second, third and fourth secondary vacuum heads 112, 114, 116, 118 relative to the location and/or position of the primary vacuum head 106 are based on at least one property (e.g., a size, a shape, a porosity, etc.) of the second thermoplastic part 704. For example, each one of the first, second, third and fourth secondary vacuum heads 112, 114, 116, 118 can be located in its respective first example deployed position shown in FIGS. 7 and 8 based on the size and/or the shape of the second thermoplastic part 704. The size of the second thermoplastic part 704 shown in FIGS. 7 and 8 is greater than the size of the first thermoplastic part 132 shown in FIGS. 1-4. Reconfiguring the locations and/or positions of the first, second, third and fourth secondary vacuum heads 112, 114, 116, 118 from the retracted positions shown in FIGS. 1-6 to the first example deployed positions shown in FIGS. 7 and 8 enables the end effector 100 to pick up the second thermoplastic part 704.

Figure 9:
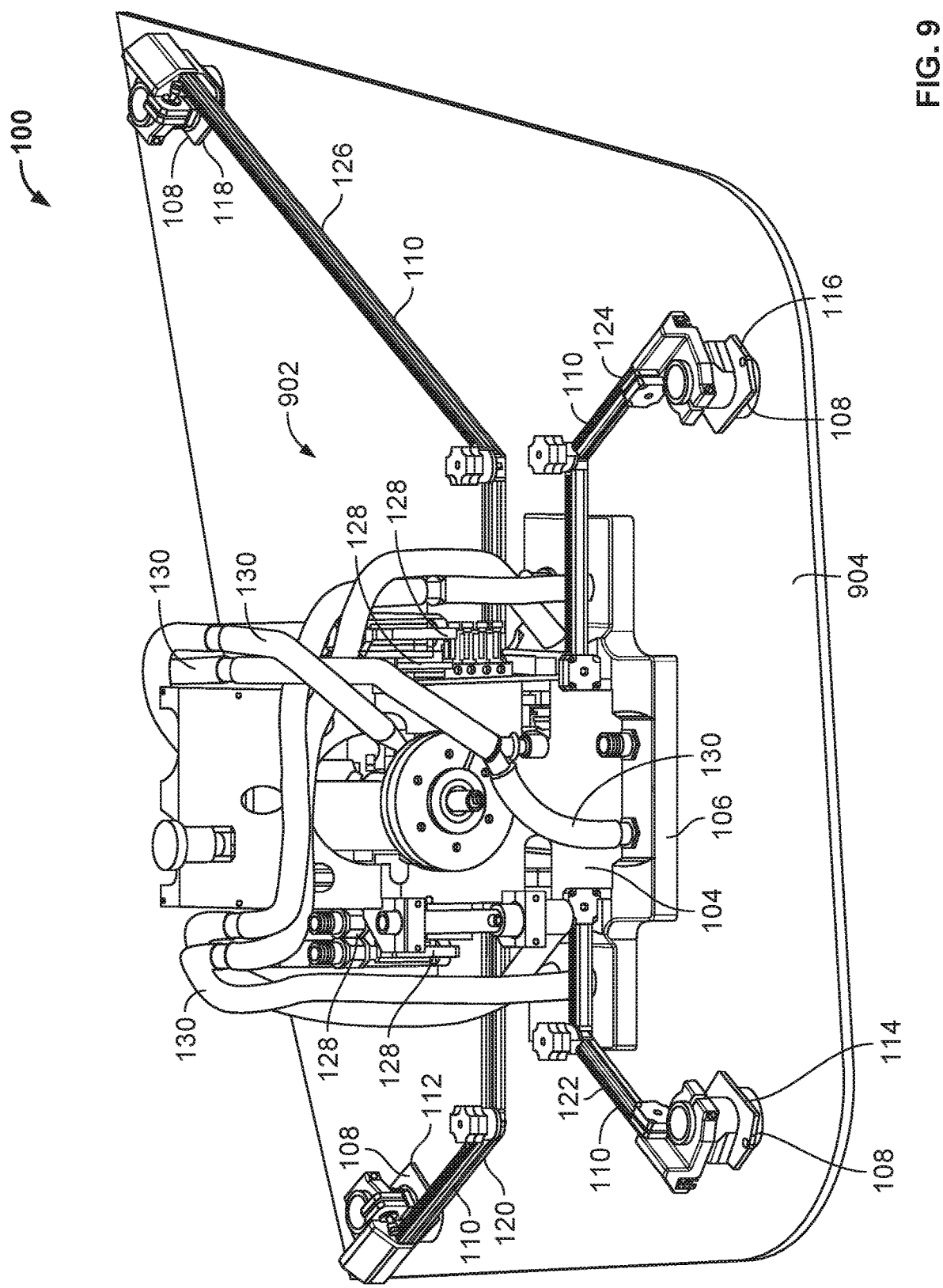
FIG. 9 is a perspective view of the example end effector of FIGS. 1-8 shown in a third example configuration.
Figure 10:
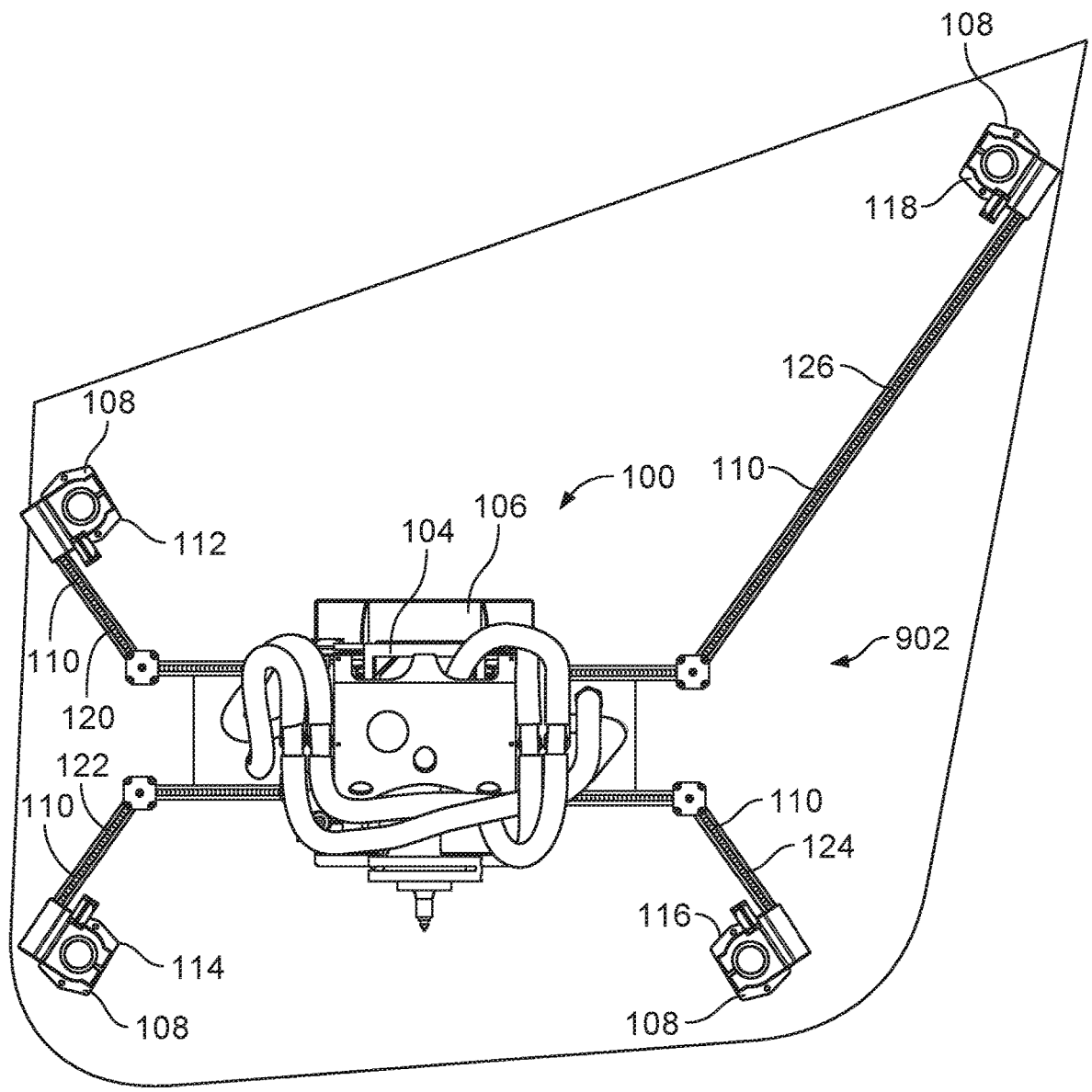
FIG. 10 is a plan view of the example end effector of FIGS. 1-9 shown in the third example configuration of FIG. 9.

As another example, FIG. 9 is a perspective view of the example end effector 100 of FIGS. 1-8 shown in a third example configuration 902. FIG. 10 is a plan view of the example end effector 100 of FIGS. 1-9 shown in the third example configuration 902 of FIG. 9. The third configuration 902 of the end effector 100 shown in FIGS. 9 and 10 differs from the second configuration 702 of the end effector 100 shown in FIGS. 7 and 8 in that the fourth secondary vacuum head 118 of the end effector 100 has been moved via the fourth adjustable arm 126 of the end effector 100 from the first example deployed position shown in FIGS. 7 and 8 to the second example deployed position shown in FIGS. 9 and 10. In some examples, the fourth adjustable arm 126 is a telescoping arm capable of elongating such that the fourth secondary vacuum head 118 is moved from the first example deployed position shown in FIGS. 7 and 8 to the second example deployed position shown in FIGS. 9 and 10. In other examples, more than one (e.g., all) of the first, second, third and fourth adjustable arms 120, 122, 124, 126 can be implemented as telescoping arms. In such examples, the telescoping capabilities of the first, second, third and fourth adjustable arms 120, 122, 124, 126 of the end effector 100 advantageously enable the footprint of the end effector 100 to be minimized when the first, second, third and fourth secondary vacuum heads 112, 114, 116, 118 are in their respective retracted positions.

In the illustrated example of FIGS. 9 and 10, the primary vacuum surface 520 of the primary vacuum head 106 and the first, second, third and fourth secondary vacuum surfaces 524, 528, 532, 536 of the first, second, third and fourth secondary vacuum heads 112, 114, 116, 118 are positioned against and/or in contact with a third example thermoplastic part 904. Application of the above-described primary vacuum force(s) at the primary vacuum surface 520 and application of the above-described secondary vacuum forces at the first, second, third and fourth secondary vacuum surfaces 524, 528, 532, 536 causes the primary vacuum head 106 and the first, second, third and fourth secondary vacuum heads 112, 114, 116, 118, and/or, more generally, the end effector 100 to pick up the third thermoplastic part 904. Subsequent to the third thermoplastic part 904 being picked up by the above-described vacuum surfaces of the end effector 100, the robot coupled to the end effector 100 can control the end effector 100 to move the third thermoplastic part 904 from a first location at which the third thermoplastic part 904 was picked up to a second location at which the third thermoplastic part 904 is to be placed (e.g., placed in contact with another thermoplastic part such as the first thermoplastic part 132 of FIGS. 1-4 or the second thermoplastic part 704 of FIGS. 7 and 8).

In the illustrated example of FIGS. 9 and 10, the respective locations and/or positions of the first, second, third and fourth secondary vacuum heads 112, 114, 116, 118 relative to the location and/or position of the primary vacuum head 106 are based on at least one property (e.g., a size, a shape, a porosity, etc.) of the third thermoplastic part 904. For example, each one of the first, second, third and fourth secondary vacuum heads 112, 114, 116, 118 can be located in its respective second example deployed position shown in FIGS. 9 and 10 based on the size and/or the shape of the third thermoplastic part 904. The size of the third thermoplastic part 904 of FIGS. 9 and 10 is greater than the size of the second thermoplastic part 704 shown in FIGS. 7 and 8. Reconfiguring the location and/or position of the fourth secondary vacuum head 118 from the first example deployed position shown in FIGS. 7 and 8 to the second example deployed position shown in FIGS. 9 and 10 enables the end effector 100 to pick up the third thermoplastic part 904.

As demonstrated by FIGS. 1-10, each of the first, second, third and fourth secondary vacuum heads 112, 114, 116, 118 of the end effector 100 can independently be positioned and/or moved relative to the primary vacuum head 106 of the end effector 100 to change and/or reconfigure the collective layout of the vacuum heads (e.g., the combined layout of the primary vacuum head 106 and the first, second, third and fourth secondary vacuum heads 112, 114, 116, 118) of the end effector 100. The reconfigurable nature of the first, second, third and fourth secondary vacuum heads 112, 114, 116, 118 relative to the primary vacuum head 106 of the end effector 100 enables the end effector 100 to pick up various thermoplastic parts having different and wide-ranging properties (e.g., different shapes, different sizes, different porosities, etc.).

The structure and operation of the adjustable arms 110 of the end effector 100 of FIGS. 1-10 is now described in greater detail. Although the description that follows is directed to the first adjustable arm 120 of the end effector 100 of FIGS. 1-10 described above, it is to be understood that any of the second, third and fourth adjustable arms 122, 124, 126 of the end effector 100 of FIGS. 1-10 described above can be structured, configured, and/or implemented in a manner that is substantially identical to the description of the first adjustable arm 120 of the end effector 100 provided herein.

Figure 11:
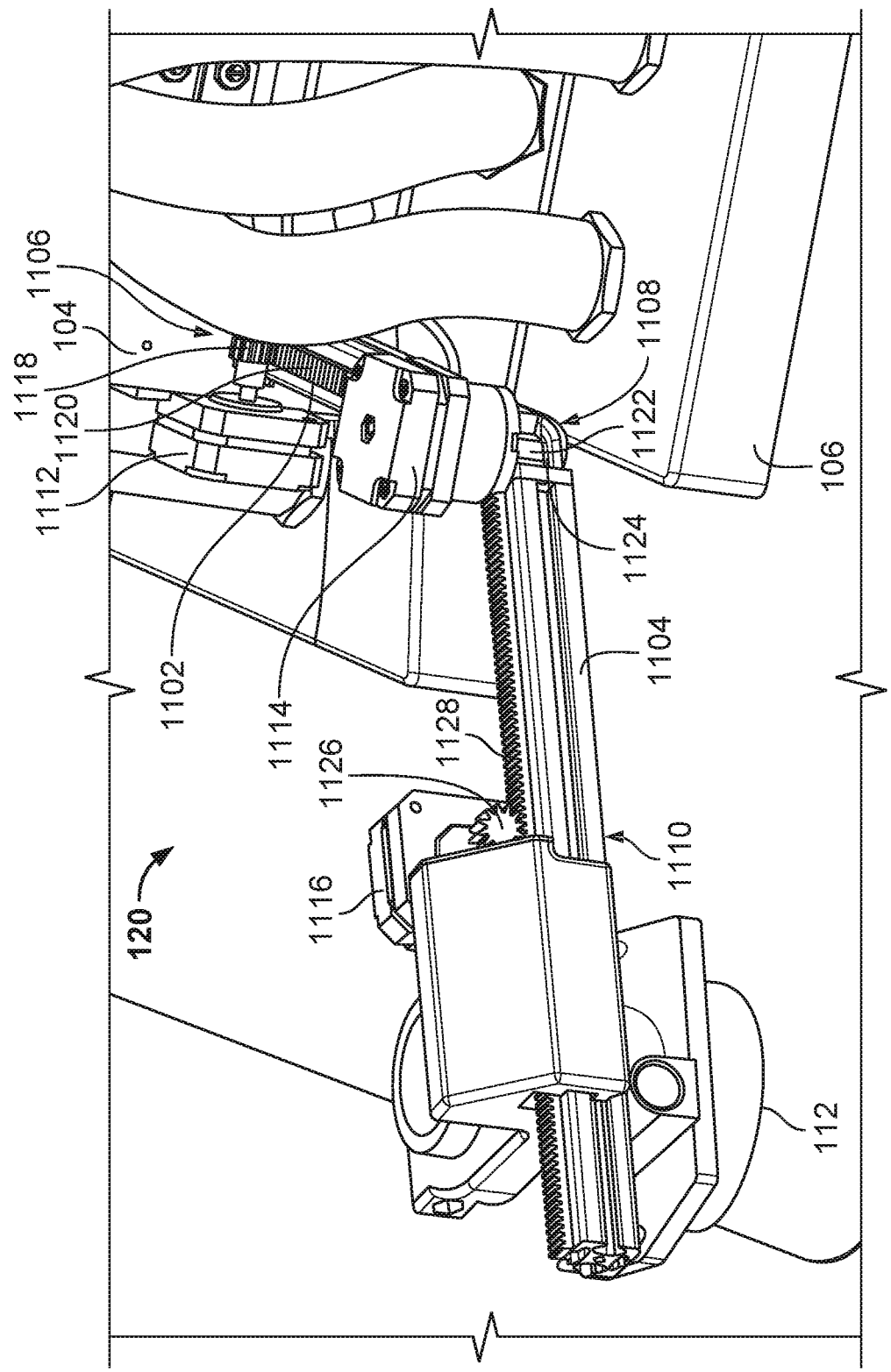
FIG. 11 is a first perspective view of the first example adjustable arm of the example end effector of FIGS. 1-10.
Figure 12:
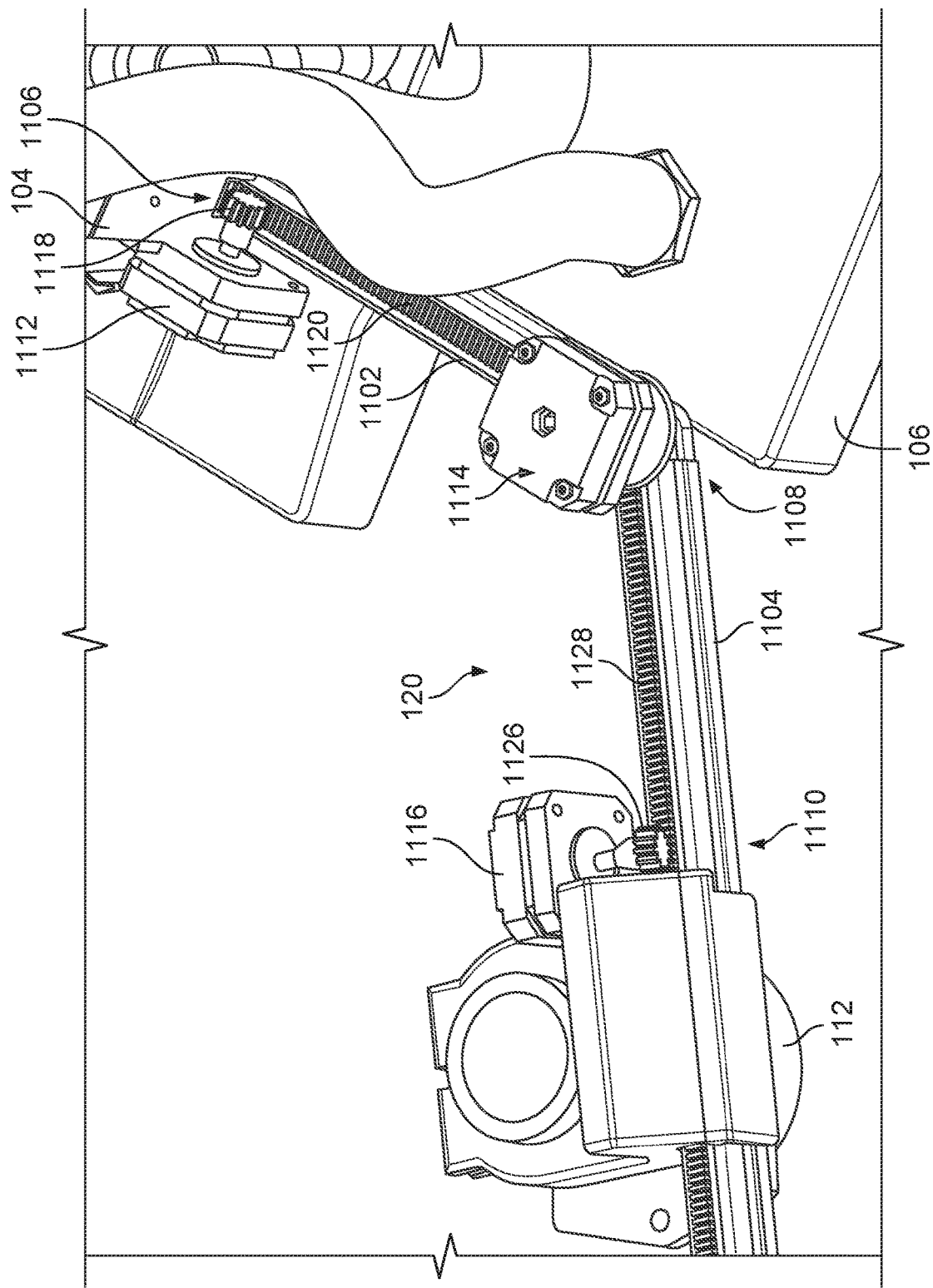
FIG. 12 is a second perspective view of the first example adjustable arm of the example end effector of FIGS. 1-11.
Figure 13:
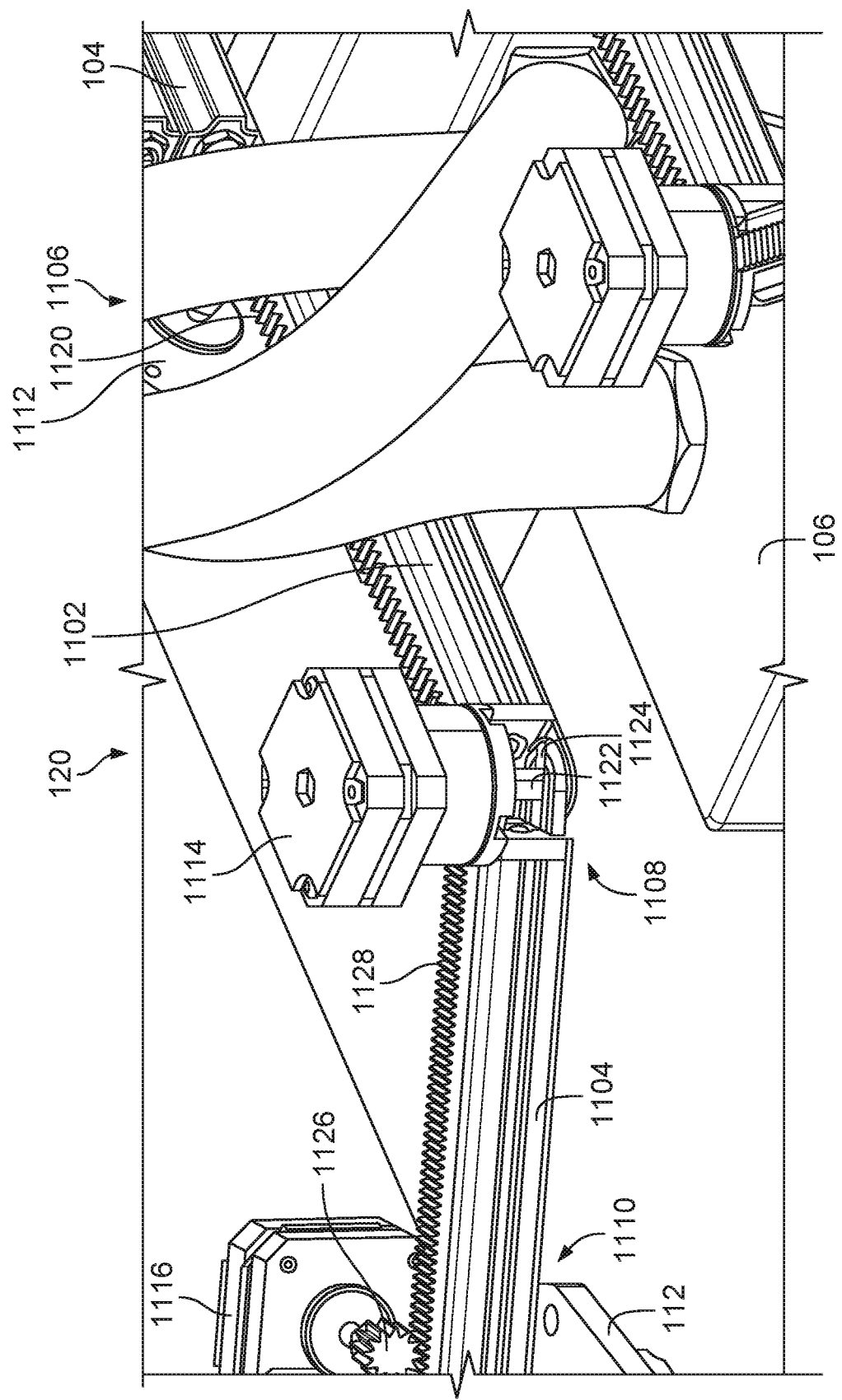
FIG. 13 is a third perspective view of the first example adjustable arm of the example end effector of FIGS. 1-12.

FIG. 11 is a first perspective view of the first example adjustable arm 120 of the example end effector 100 of FIGS. 1-10. FIG. 12 is a second perspective view of the first example adjustable arm 120 of the example end effector 100 of FIGS. 1-11. FIG. 13 is a third perspective view of the first example adjustable arm 120 of the example end effector 100 of FIGS. 1-12. In the illustrated example of FIGS. 11-13, the first adjustable arm 120 includes a first example segment 1102 and a second example segment 1104. A first example joint 1106 movably couples the first segment 1102 of the first adjustable arm 120 of FIGS. 11-13 to the frame 104 and/or the primary vacuum head 106 of the end effector 100 of FIGS. 1-13. A second example joint 1108 movably coupled the second segment 1104 of the first adjustable arm 120 of FIGS. 11-13 to the first segment 1102 of the first adjustable arm 120 of FIGS. 11-13. A third example joint 1110 movably couples the first secondary vacuum head 112 of the end effector 100 of FIGS. 1-13 to the second segment 1104 of the first adjustable arm 120 of FIGS. 11-13.

The first joint 1106 of FIGS. 11-13 enables linear and/or translational movement of the first segment 1102 of the first adjustable arm 120 relative to the frame 104 and/or the primary vacuum head 106 of the end effector 100. The second joint 1108 of FIGS. 11-13 enables pivotal and/or rotational movement of the second segment 1104 of the first adjustable arm 120 relative to the first segment 1102 of the first adjustable arm 120. The third joint 1110 of FIGS. 11-13 enables linear and/or translational movement of the first secondary vacuum head 112 of the end effector 100 relative to the second segment 1104 of the first adjustable arm 120. In other examples, the first adjustable arm 120 can include a different number (e.g., 1, 3, 4, etc.) of segments and/or a different number (e.g., 1, 2, 4, etc.) of joints relative to the configuration of the first adjustable arm 120 shown in FIGS. 11-13. Furthermore, although not expressly shown in the example of FIGS. 11-13, the first segment 1102 and/or the second segment 1104 of the first adjustable arm 120 can include one or more telescoping element(s) that enables the first segment 1102 and/or the second segment 1104 to extend and/or retract to various lengths.

In the illustrated example of FIGS. 11-13, the first adjustable arm 120 further includes a first example actuator 1112 located at and/or operatively coupled to the first joint 1106 of the first adjustable arm 120, a second example actuator 1114 located at and/or operatively coupled to the second joint 1108 of the first adjustable arm 120, and a third example actuator 1116 located at and/or operatively coupled to the third joint 1110 of the first adjustable arm 120. Each one of the first, second and third actuators 1112, 1114, 1116 of FIGS. 11-13 is implemented by and/or as a servo that is operatively coupled to (e.g., in electrical communication with) a controller (e.g., a computer-based controller) that can be mounted on the end effector 100, and/or on the robot to which the end effector 100 is coupled. In some examples, the controller determines one or more propert(ies) of a thermoplastic part to be picked up by the end effector 100. For example, the controller can access a digital model of a thermoplastic part from which the one or more propert(ies) of the thermoplastic part can be identified and/or determined. The controller generates one or more control signal(s) based on the determined propert(ies) of the thermoplastic part. The control signal(s) generated by the controller are transmitted to the first, second and/or third actuators 1112, 1114, 1116 of the first adjustable arm 120 of FIGS. 11-13. Reception of the control signal(s) at the first, second and/or third actuators 1112, 1114, 1116 of the first adjustable arm 120 causes the first, second and/or third actuators 1112, 1114, 1116 to actuate the corresponding first, second and/or third joints 1106, 1108, 1110 of the first adjustable arm 120 of FIGS. 11-13.

For example, a control signal received at the first actuator 1112 from the controller can cause the first actuator 1112 of FIGS. 11-13 to actuate the first joint 1106 of the first adjustable arm 120 of FIGS. 11-13. The actuation of the first joint 1106 via the first actuator 1112 causes the first segment 1102 of the first adjustable arm 120 to move (e.g., translate) relative to the frame 104 and/or the primary vacuum head 106 of the end effector 100. As another example, a control signal received at the second actuator 1114 from the controller can cause the second actuator 1114 of FIGS. 11-13 to actuate the second joint 1108 of the first adjustable arm 120 of FIGS. 11-13. The actuation of the second joint 1108 via the second actuator 1114 causes the second segment 1104 of the first adjustable arm 120 to move (e.g., rotate) relative to the first segment 1102 of the first adjustable arm 120. As another example, a control signal received at the third actuator 1116 from the controller can cause the third actuator 1116 of FIGS. 11-13 to actuate the third joint 1110 of the first adjustable arm 120 of FIGS. 11-13. The actuation of the third joint 1110 via the third actuator 1116 causes the first secondary vacuum head 112 of the end effector 100 to move (e.g., translate) relative to the second segment 1104 of the first adjustable arm 120.

In the illustrated example of FIGS. 11-13, the first actuator 1112 includes a first example pinion 1118 that rotates in response to actuation of the first actuator 1112. The first pinion 1118 of the first actuator 1112 engages (e.g., meshes with) a first example rack 1120 formed by and/or mounted on the first segment 1102 of the first adjustable arm 120. The first actuator 1112 of FIGS. 11-13 is fixedly coupled to the frame 104 of the end effector 100 such that rotation of the first pinion 1118 of the of the first actuator 1112 of FIGS. 11-13 causes a corresponding translational and/or linear movement of the first rack 1120 and/or, more generally, of the first segment 1102 of the first adjustable arm 120 relative to the frame 104 and/or the primary vacuum head 106 of the end effector 100. The first joint 1106 of the first adjustable arm 120 of FIGS. 11-13 is accordingly formed in part by the first pinion 1118 of the first actuator 1112 and the first rack 1120 of the first segment 1102 of the first adjustable arm 120.

In the illustrated example of FIGS. 11-13, the second actuator 1114 includes an example tongue 1122 that rotates in response to actuation of the second actuator 1114. The tongue 1122 of the second actuator 1114 engages (e.g. is received within) an example slot 1124 formed in the second segment 1104 of the first adjustable arm 120. The second actuator 1114 of FIGS. 11-13 is fixedly coupled to the first segment 1102 of the first adjustable arm 120 such that rotation of the tongue 1122 of the of the second actuator 1114 of FIGS. 11-13 causes a corresponding rotational and/or pivotal movement of the slot 1124 and/or, more generally, of the second segment 1104 of the first adjustable arm 120 relative to the first segment 1102 of the first adjustable arm 120. The second joint 1108 of the first adjustable arm 120 of FIGS. 11-13 is accordingly formed in part by the tongue 1122 of the second actuator 1114 and the slot 1124 of the second segment 1104 of the first adjustable arm 120.

In the illustrated example of FIGS. 11-13, the third actuator 1116 includes a second example pinion 1126 that rotates in response to actuation of the third actuator 1116. The second pinion 1126 of the third actuator 1116 engages (e.g., meshes with) a second example rack 1128 formed by and/or mounted on the second segment 1104 of the first adjustable arm 120. The third actuator 1116 of FIGS. 11-13 is fixedly coupled to the first secondary vacuum head 112 of the end effector 100 such that rotation of the second pinion 1126 of the of the third actuator 1116 of FIGS. 11-13 causes a corresponding translational and/or linear movement of the first secondary vacuum head 112 of the end effector 100 relative to the second rack 1128 and/or, more generally, relative to the second segment 1104 of the first adjustable arm 120. The third joint 1110 of the first adjustable arm 120 of FIGS. 11-13 is accordingly formed in part by the second pinion 1126 of the third actuator 1116 and the second rack 1128 of the second segment 1104 of the first adjustable arm 120.

In other examples, respective ones of the first, second and third actuators 1112, 1114, 1116 can be structured and/or configured in a manner that differs from that described above. For example, different types and/or different arrangements of automated actuators may be implemented relative to the first, second and third actuators 1112, 1114, 1116 described above. In still other examples, one or more of the first, second and/or third actuators 1112, 1114, 1116 of the first adjustable arm 120 of FIGS. 11-13 can be omitted and replaced by a corresponding manually-operated mechanism (e.g., a slide joint, a hinge joint, a ball-and-socket joint, etc.) that is structured and/or configured to enable the above-described relative movements of the first segment 1102 of the first adjustable arm 120, the second segment 1104 of the first adjustable arm 120, and/or the first secondary vacuum head 112 of the end effector 100 at the first, second and/or third joints 1106, 1108, 1110 of the first adjustable arm 120 of FIGS. 11-13.

Figure 14:
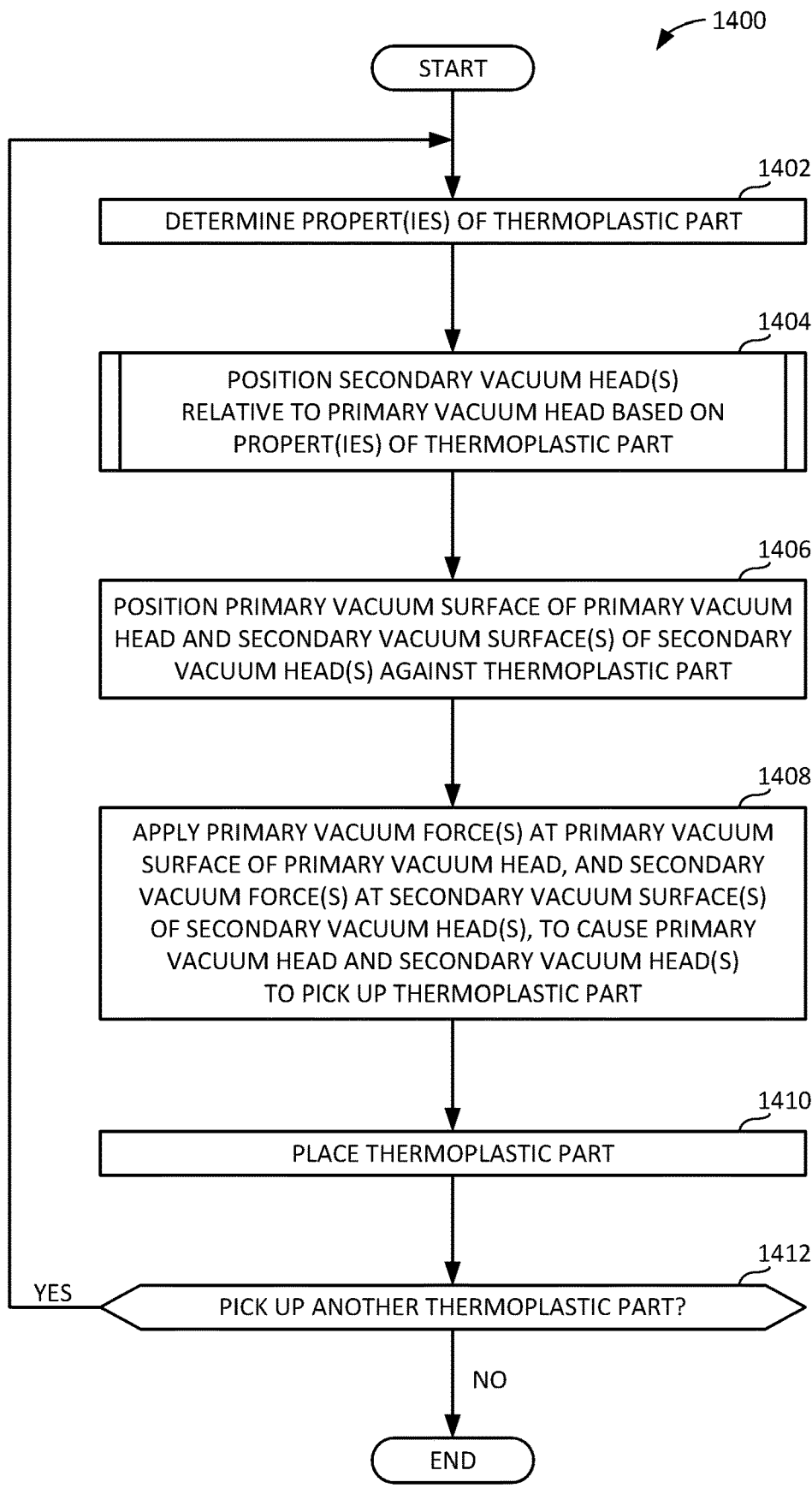
FIG. 14 is a flowchart representative of an example method for implementing the example end effector of FIGS. 1-13 to pick up thermoplastic parts of thermoplastic composite laminated articles.

FIG. 14 is a flowchart representative of an example method 1400 for implementing the example end effector 100 of FIGS. 1-13 to pick up thermoplastic parts of thermoplastic composite laminated articles. In some examples, the method 1400 of FIG. 14 can be implemented via the example end effector 100 of FIGS. 1-13 as programmed and/or controlled via a robot to which the end effector 100 is coupled. In other examples, one or more operations of the method 1400 of FIG. 14 can alternatively be performed manually.

The method 1400 of FIG. 14 begins with determining one or more propert(ies) of a thermoplastic part to be picked up by the end effector 100 of FIGS. 1-13 (block 1402). For example, a controller of the end effector 100 of FIGS. 1-13, or of the robot to which the end effector 100 of FIGS. 1-13 is coupled, can determine a size, a shape, and/or a porosity of a thermoplastic part (e.g., the first thermoplastic part 132 of FIGS. 1-4, the second thermoplastic part 704 of FIGS. 7 and 8, the third thermoplastic part 904 of FIGS. 9 and 10, etc.) to be picked up by the end effector 100.

The method 1400 of FIG. 14 includes positioning one or more secondary vacuum head(s) of the end effector 100 of FIGS. 1-13 relative to a primary vacuum head of the end effector 100 of FIGS. 1-13 based on the determined propert(ies) of the thermoplastic part (block 1404). For example, one or more of the first, second, third and/or fourth secondary vacuum heads 112, 114, 116, 118 of the end effector 100 of FIGS. 1-13 can be positioned relative to the primary vacuum head 106 of the end effector 100 of FIGS. 1-13 via a corresponding one or more of the first, second, third and/or fourth adjustable arms 120, 122, 124, 126 of the end effector 100 of FIGS. 1-13 and based on the determined propert(ies) of the thermoplastic part. An example method that can be used to implement block 1404 of the example method 1400 of FIG. 14 is described in greater detail below in connection with FIG. 15.

The method 1400 of FIG. 14 includes positioning a primary vacuum surface of the primary vacuum head and one or more secondary vacuum surface(s) of the secondary vacuum head(s) against the thermoplastic part (block 1406). For example, the primary vacuum surface 520 of the primary vacuum head 106 of FIGS. 1-6 and one or more of the first, second, third and/or fourth secondary vacuum surfaces 524, 528, 532, 536 of corresponding ones of the first, second, third and/or fourth secondary vacuum heads 112, 114, 116, 118 of the end effector 100 of FIGS. 1-13 can be placed against the thermoplastic part.

The method 1400 of FIG. 14 includes applying one or more primary vacuum force(s) at the primary vacuum surface of the primary vacuum head, and applying one or more secondary vacuum force(s) at the one or more secondary vacuum surfaces of the secondary vacuum head(s), to cause the primary vacuum head and the secondary vacuum head(s) to pick up the thermoplastic part (block 1408). For example, one or more primary vacuum force(s) can be applied at the primary vacuum surface 520 of the primary vacuum head 106 of FIGS. 1-13, and one or more secondary vacuum force(s) can be applied at one or more of the first, second, third and/or fourth secondary vacuum surfaces 524, 528, 532, 536 of corresponding ones of the first, second, third and/or fourth secondary vacuum heads 112, 114, 116, 118 of the end effector 100 of FIGS. 1-13, to cause the primary vacuum head 106 of FIGS. 1-13 and the one or more of the first, second, third and/or fourth secondary vacuum heads 112, 114, 116, 118 to pick up the thermoplastic part.

The method 1400 of FIG. 14 includes placing the thermoplastic part (block 1410). For example, the end effector 100 of FIGS. 1-13 can place the thermoplastic part in response to the primary vacuum force(s) applied at the primary vacuum surface 520 of the primary vacuum head 106 of FIGS. 1-13 and the secondary vacuum force(s) applied at the one or more of the first, second, third and/or fourth secondary vacuum surfaces 524, 528, 532, 536 of the corresponding ones of the first, second, third and/or fourth secondary vacuum heads 112, 114, 116, 118 being interrupted and/or discontinued. In some examples, the thermoplastic part can be placed against and/or in contact with another thermoplastic part in connection with forming a thermoplastic composite laminated article and/or a thermoplastic composite layup.

The method 1400 of FIG. 14 includes determining whether to pick up another thermoplastic part with the end effector 100 of FIGS. 1-13 (block 1412). If another thermoplastic part is to be picked up by the end effector 100, the method 1400 of FIG. 14 returns to block 1402 described above. If another thermoplastic part is not to be picked up by the end effector 100, the method 1400 of FIG. 14 ends.

Figure 15:
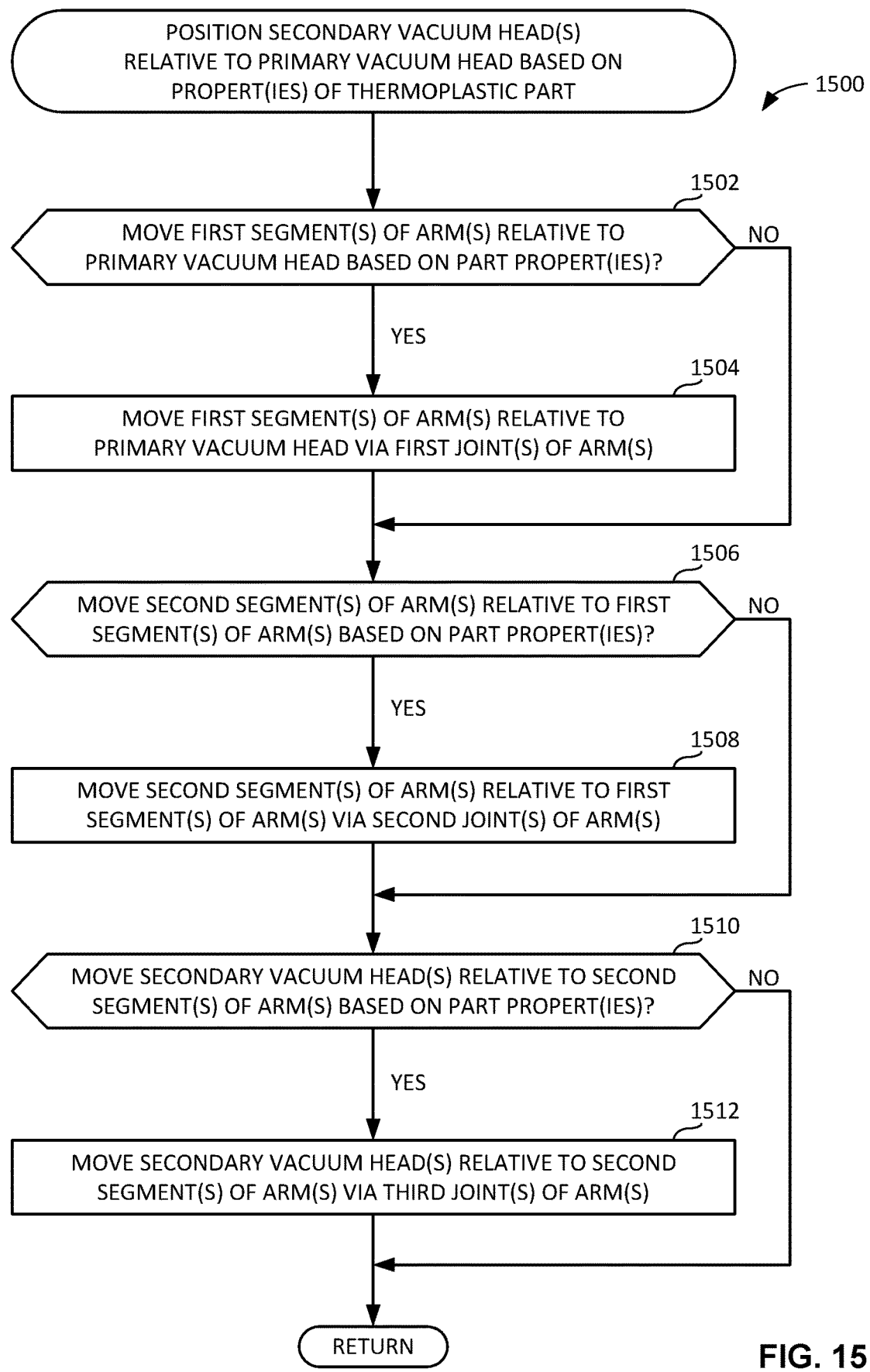
FIG. 15 is a flowchart representative of an example method for positioning respective ones of the example secondary vacuum heads of the example end effector of FIGS. 1-13 in connection with performing the example method of FIG. 14.

FIG. 15 is a flowchart representative of an example method 1500 for positioning respective ones of the example secondary vacuum heads 108 of the example end effector 100 of FIGS. 1-13 in connection with performing the example method 1400 of FIG. 14. Example operations of blocks 1502, 1504, 1506, 1508, 1510 and 1512 of FIG. 15 can be used to implement block 1404 of FIG. 14 described above. In some examples, the method 1500 of FIG. 15 can be implemented via the example end effector 100 of FIGS. 1-13 as programmed and/or controlled via a robot to which the end effector 100 is coupled. In other examples, one or more operations of the method 1500 of FIG. 15 can alternatively be performed manually.

The method 1500 of FIG. 15 includes determining whether to move the first segment(s) of the adjustable arm(s) of the end effector 100 of FIGS. 1-13 relative to the primary vacuum head of the end effector 100 based on the determined propert(ies) of the thermoplastic part (block 1502). For example, a controller of the end effector 100 of FIGS. 1-13 can determine whether to move the first segment 1102 of the first adjustable arm 120 of the end effector 100 relative to the primary vacuum head 106 of the end effector 100 based on the determined propert(ies) of the thermoplastic part. The controller can make a similar determination for the first segment of each of the second, third and fourth adjustable arms 122, 124, 126 of the end effector 100. If a first segment of any of the first, second, third and/or fourth adjustable arms 120, 122, 124, 126 is to be moved, the method 1500 of FIG. 15 proceeds to block 1504. If no first segment of any of the first, second, third and/or fourth adjustable arms 120, 122, 124, 126 is to be moved, the method 1500 of FIG. 15 proceeds to block 1506.

At block 1504, the method 1500 of FIG. 15 includes moving the first segment(s) of the adjustable arm(s) relative to the primary vacuum head via the first joint(s) of the adjustable arm(s) (block 1504). For example, in response to a control signal received from the controller of the end effector 100 of FIGS. 1-13, the first actuator 1112 of FIGS. 11-13 can actuate the first joint 1106 of FIGS. 11-13 to move the first segment 1102 of the first adjustable arm 120 of FIGS. 11-13 relative to the primary vacuum head 106. Following block 1504, the method 1500 of FIG. 15 proceeds to block 1506.

The method 1500 of FIG. 15 includes determining whether to move the second segment(s) of the adjustable arm(s) of the end effector 100 of FIGS. 1-13 relative to the first segment(s) of the adjustable arm(s) of the end effector 100 based on the determined propert(ies) of the thermoplastic part (block 1506). For example, a controller of the end effector 100 of FIGS. 1-13 can determine whether to move the second segment 1104 of the first adjustable arm 120 of the end effector 100 relative to the first segment 1102 of the first adjustable arm 120 of the end effector 100 based on the determined propert(ies) of the thermoplastic part. The controller can make a similar determination for the second segment of each of the second, third and fourth adjustable arms 122, 124, 126 of the end effector 100. If a second segment of any of the first, second, third and/or fourth adjustable arms 120, 122, 124, 126 is to be moved, the method 1500 of FIG. 15 proceeds to block 1508. If no second segment of any of the first, second, third and/or fourth adjustable arms 120, 122, 124, 126 is to be moved, the method 1500 of FIG. 15 proceeds to block 1510.

At block 1508, the method 1500 of FIG. 15 includes moving the second segment(s) of the adjustable arm(s) relative to the first segment(s) of the adjustable arm(s) via the second joint(s) of the adjustable arm(s) (block 1508). For example, in response to a control signal received from the controller of the end effector 100 of FIGS. 1-13, the second actuator 1114 of FIGS. 11-13 can actuate the second joint 1108 of FIGS. 11-13 to move the second segment 1104 of the first adjustable arm 120 of FIGS. 11-13 relative to the first segment 1102 of the first adjustable arm 120 of FIGS. 11-13. Following block 1508, the method 1500 of FIG. 15 proceeds to block 1510.

The method 1500 of FIG. 15 includes determining whether to move the secondary vacuum head(s) of the end effector 100 of FIGS. 1-13 relative to the second segment(s) of the adjustable arm(s) of the end effector 100 based on the determined propert(ies) of the thermoplastic part (block 1510). For example, a controller of the end effector 100 of FIGS. 1-13 can determine whether to move the first secondary vacuum head 112 of the end effector 100 relative to the second segment 1104 of the first adjustable arm 120 based on the determined propert(ies) of the thermoplastic part. The controller can make a similar determination for each of the second, third and fourth secondary vacuum heads 114, 116, 118 of the end effector 100. If any of the first, second, third and/or fourth secondary vacuum heads 112, 114, 116, 118 is/are to be moved, the method 1500 of FIG. 15 proceeds to block 1512. If none of the first, second, third and/or fourth secondary vacuum heads 112, 114, 116, 118 is to be moved, the method 1500 of FIG. 15 ends and returns to the method 1400 of FIG. 14 described above.

At block 1512, the method 1500 of FIG. 15 includes moving the secondary vacuum head(s) relative to the second segment(s) of the adjustable arm(s) via the third joint(s) of the adjustable arm(s) (block 1512). For example, in response to a control signal received from the controller of the end effector 100 of FIGS. 1-13, the third actuator 1116 of FIGS. 11-13 can actuate the third joint 1110 of FIGS. 11-13 to move the first secondary vacuum head 112 of FIGS. 11-13 relative to the second segment 1104 of the first adjustable arm 120 of FIGS. 11-13. Following block 1512, the method 1500 of FIG. 15 ends and returns to the method 1400 of FIG. 14 described above.

From the foregoing, it will be appreciated that the disclosed end effectors include reconfigurable vacuum heads for picking up thermoplastic parts of thermoplastic composite laminated articles. More specifically, the disclosed end effectors include a primary vacuum head, one or more secondary vacuum head(s), and one or more adjustable arm(s) corresponding in number to the number of secondary vacuum heads. Each one of the secondary vacuum heads is coupled (e.g., movably coupled) to a corresponding one of the adjustable arms. Each one of the adjustable arms is coupled (e.g., movably coupled) to the primary vacuum head and/or to a frame of the end effector. Each one of the secondary vacuum heads can advantageously be positioned and/or moved (e.g., via its corresponding one of the adjustable arms) relative to the primary vacuum head and/or, in examples including more than one secondary vacuum head, relative to one another. The position(s) and/or movement(s) of the secondary vacuum head(s) relative to the primary vacuum head is/are based on at least one property (e.g., a size, a shape, a porosity, etc.) of a thermoplastic part to be picked up by the primary vacuum head and the secondary vacuum head(s) of the end effector. The reconfigurable vacuum heads of the disclosed end effectors advantageously reduce (e.g., eliminate) inefficiencies that can be associated with implementing an end effector having a single, fixed-frame vacuum head In some examples, an end effector to be coupled to a robot is disclosed. In some disclosed examples, the end effector comprises a first vacuum head including a first vacuum surface. In some disclosed examples, the first vacuum head is to pick up a thermoplastic part in response to a first vacuum force applied at the first vacuum surface. In some disclosed examples, the end effector further comprises a second vacuum head including a second vacuum surface. In some disclosed examples, the second vacuum head is to assist the first vacuum head in picking up the thermoplastic part in response to a second vacuum force applied at the second vacuum surface. In some disclosed examples, the end effector further comprises an arm to adjustably position the second vacuum head relative to the first vacuum head. In some disclosed examples, the second vacuum head is coupled to the arm. In some disclosed examples, the arm is movable relative to the first vacuum head.

In some disclosed examples, the arm is to adjustably position the second vacuum head relative to the first vacuum head based on a property of the thermoplastic part. In some disclosed examples, the property is at least one of a size, a shape, or a porosity of the thermoplastic part.

In some disclosed examples, the first vacuum head includes a pocket shaped to receive the second vacuum head. In some disclosed examples, the second vacuum head is to be positioned within the pocket when the first vacuum head and the second vacuum head are to pick up a first thermoplastic part having a first property. In some disclosed examples, the second vacuum head is to be positioned away from the pocket when the first vacuum head and the second vacuum head are to pick up a second thermoplastic part having a second property that differs from the first property. In some disclosed examples, the first property is a first size, and the second property is a second size greater than the first size.

In some disclosed examples of the method, the second vacuum head is an air amplifier.

In some disclosed examples, the arm is movable relative to the first vacuum head via a first joint of the arm. In some disclosed examples, the end effector further comprises an actuator located at the first joint. In some disclosed examples, the actuator is to actuate the first joint to move the arm relative to the first vacuum head.

In some disclosed examples, the arm further includes a first segment, a second segment, and a second joint. In some disclosed examples, the second segment is coupled to the first segment and is movable relative to the first segment via the second joint. In some disclosed examples, the second vacuum head is coupled to the second segment. In some disclosed examples, the end effector further comprises an actuator located at the second joint. In some disclosed examples, the actuator is to actuate the second joint to move the second segment relative to the first segment.

In some disclosed examples, the second vacuum head is movable relative to the second segment via a third joint of the arm. In some disclosed examples, the end effector further comprises an actuator located at the third joint. In some disclosed examples, the actuator is to actuate the third joint to move the second vacuum head relative to the second segment.

In some disclosed examples, the arm is a first arm. In some disclosed examples, the end effector further comprises a third vacuum head including a third vacuum surface. In some disclosed examples, the third vacuum head is to assist the first vacuum head in picking up the thermoplastic part in response to a third vacuum force applied at the third vacuum surface. In some disclosed examples, the end effector further comprises a second arm to adjustably position the third vacuum head relative to the first vacuum head. In some disclosed examples, the third vacuum head is coupled to the second arm, and the second arm is movable relative to the first vacuum head. In some disclosed examples, the end effector further comprises a fourth vacuum head including a fourth vacuum surface. In some disclosed examples, the fourth vacuum head is to assist the first vacuum head in picking up the thermoplastic part in response to a fourth vacuum force applied at the fourth vacuum surface. In some disclosed examples, the end effector further comprises a third arm to adjustably position the fourth vacuum head relative to the first vacuum head. In some disclosed examples, the fourth vacuum head is coupled to the third arm, and the third arm is movable relative to the first vacuum head. In some disclosed examples, the end effector further comprises a fifth vacuum head including a fifth vacuum surface. In some disclosed examples, the fifth vacuum head is to assist the first vacuum head in picking up the thermoplastic part in response to a fifth vacuum force applied at the fifth vacuum surface. In some disclosed examples, the end effector further comprises a fourth arm to adjustably position the fifth vacuum head relative to the first vacuum head. In some disclosed examples, the fifth vacuum head is coupled to the fourth arm, and the fourth arm is movable relative to the first vacuum head.

In some examples, a method for picking up a thermoplastic part with an end effector coupled to a robot is disclosed. In some disclosed examples of the method, the end effector includes a first vacuum head and a second vacuum head. In some disclosed examples of the method, the second vacuum head is adjustably positionable relative to the first vacuum head via an arm. In some disclosed examples, the method comprises positioning the second vacuum head relative to the first vacuum head based on a property of the thermoplastic part. In some disclosed examples of the method, the property is at least one of a size, a shape, or a porosity of the thermoplastic part. In some disclosed examples, the method further comprises positioning a first vacuum surface of the first vacuum head and a second vacuum surface of the second vacuum head against the thermoplastic part. In some disclosed examples, the method further comprises applying a first vacuum force at the first vacuum surface and a second vacuum force at the second vacuum surface. In some disclosed examples, the first and second vacuum forces respectively cause the first and second vacuum heads to pick up the thermoplastic part.

In some disclosed examples of the method, the first vacuum head includes a pocket shaped to receive the second vacuum head. In some disclosed examples of the method, the second vacuum head is to be positioned within the pocket when the first vacuum head and the second vacuum head are to pick up a first thermoplastic part having a first property. In some disclosed examples of the method, the second vacuum head is to be positioned away from the pocket when the first vacuum head and the second vacuum head are to pick up a second thermoplastic part having a second property that differs from the first property. In some disclosed examples of the method, the first property is a first size, and the second property is a second size greater than the first size.

In some disclosed examples of the method, the second vacuum head is an air amplifier.

In some disclosed examples of the method, positioning the second vacuum head relative to the first vacuum head includes moving the arm relative to the first vacuum head via a first joint of the arm. In some disclosed examples of the method, moving the arm relative to the first vacuum head includes actuating the arm relative to the first vacuum head via an actuator located at the first joint.

In some disclosed examples of the method, the arm further includes a first segment, a second segment, and a second joint. In some disclosed examples of the method, positioning the second vacuum head relative to the first vacuum head further includes moving the second segment relative to the first segment via the second joint. In some disclosed examples of the method, the second vacuum head is coupled to the second segment. In some disclosed examples of the method, moving the second segment relative to the first segment includes actuating the second segment relative to the first segment via an actuator located at the second joint.

In some disclosed examples of the method, positioning the second vacuum head relative to the first vacuum head further includes moving the second vacuum head relative to the second segment via a third joint of the arm. In some disclosed examples of the method, moving the second vacuum head relative to the second segment includes actuating the second vacuum head relative to the second segment via an actuator located at the third joint.

In some examples, a method for forming a thermoplastic composite layup with an end effector coupled to a robot is disclosed. In some disclosed examples of the method, the end effector includes a first vacuum head and a second vacuum head. In some disclosed examples of the method, the second vacuum head is adjustably positionable relative to the first vacuum head via an arm. In some disclosed examples, the method comprises positioning the second vacuum head at a first position relative to the first vacuum head based on a first property of a first thermoplastic part of the thermoplastic composite layup, the first property being at least one of a size, a shape, or a porosity of the first thermoplastic part. In some disclosed examples, the method comprises positioning a first vacuum surface of the first vacuum head and a second vacuum surface of the second vacuum head against the first thermoplastic part. In some disclosed examples, the method comprises picking up the first thermoplastic part with the first and second vacuum heads in response to vacuum forces applied at the first and second vacuum heads. In some disclosed examples, the method comprises placing the first thermoplastic part. In some disclosed examples, the method comprises positioning the second vacuum head at a second position relative to the first vacuum head based on a second property of a second thermoplastic part of the thermoplastic composite layup, the second property being at least one of a size, a shape, or a porosity of the second thermoplastic part, the second position being different from the first position. In some disclosed examples, the method comprises positioning the first vacuum surface of the first vacuum head and the second vacuum surface of the second vacuum head against the second thermoplastic part. In some disclosed examples, the method comprises picking up the second thermoplastic part with the first and second vacuum heads in response to vacuum forces applied at the first and second vacuum heads. In some disclosed examples, the method comprises placing the second thermoplastic part against the first thermoplastic part.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An end effector to be coupled to a robot, the end effector comprising:
   a frame;
   a first vacuum head rigidly coupled to the frame, the first vacuum head including a first vacuum surface having a first surface area, the first vacuum head configured to pick up a thermoplastic part in response to a first vacuum force applied at the first vacuum surface;
   a second vacuum head movably coupled to the frame, the second vacuum head including a second vacuum surface oriented parallel to the first vacuum surface, the second vacuum surface having a second surface area less than the first surface area, the second vacuum head configured to assist the first vacuum head in picking up the thermoplastic part in response to a second vacuum force applied at the second vacuum surface; and
   an arm extending between the frame and the second vacuum head, the arm configured to adjustably position the second vacuum head relative to the first vacuum head, the second vacuum head being coupled to the arm, the arm being translatable relative to the frame in a direction parallel to a plane defined by the first vacuum surface.

2. The end effector of claim 1, wherein the arm is configured to adjustably position the second vacuum head relative to the first vacuum head based on a property of the thermoplastic part, the property being at least one of a size, a shape, or a porosity of the thermoplastic part.

3. The end effector of claim 1, wherein the first vacuum head includes a pocket formed peripherally relative to the first vacuum head, the pocket being shaped to slidably receive the second vacuum head in a direction parallel to the plane, wherein the second vacuum head is configured to be positioned within the pocket when the first vacuum head and the second vacuum head are to pick up a first thermoplastic part having a first property, and wherein the second vacuum head is configured to be positioned away from the pocket when the first vacuum head and the second vacuum head are to pick up a second thermoplastic part having a second property that differs from the first property.

4. The end effector of claim 3, wherein the first property is a first size, and the second property is a second size greater than the first size.

5. The end effector of claim 1, wherein the second vacuum head is an air amplifier.

6. The end effector of claim 1, wherein the arm is translatable relative to the frame via a first joint of the arm.

7. The end effector of claim 6, further comprising an actuator located at the first joint, the actuator configured to actuate the first joint to translate the arm relative to the frame.

8. The end effector of claim 6, wherein the arm further includes a first segment, a second segment, and a second joint, the first segment being movably coupled to the frame and translatable relative to the frame via the first joint, the second segment being movably coupled to the first segment and rotatable relative to the first segment via the second joint.

9. The end effector of claim 8, further comprising an actuator located at the second joint, the actuator configured to actuate the second joint to rotate the second segment relative to the first segment.

10. The end effector of claim 8, wherein the second vacuum head is movably coupled to the second segment and translatable relative to the second segment via a third joint of the arm.

11. The end effector of claim 10, further comprising an actuator located at the third joint, the actuator configured to actuate the third joint to translate the second vacuum head relative to the second segment.

12. The end effector of claim 1, wherein the first vacuum head is centrally-located relative to the frame, and wherein the arm is a first arm extending peripherally from the first vacuum head, the end effector further comprising:
  a third vacuum head movably coupled to the frame, the third vacuum head including a third vacuum surface, the third vacuum head configured to assist the first vacuum head in picking up the thermoplastic part in response to a third vacuum force applied at the third vacuum surface;
  a second arm extending between the frame and the third vacuum head, the second arm configured to adjustably position the third vacuum head relative to the first vacuum head, the third vacuum head being coupled to the second arm, the second arm being translatable relative to the frame in a direction parallel to the plane;
  a fourth vacuum head movably coupled to the frame, the fourth vacuum head including a fourth vacuum surface, the fourth vacuum head configured to assist the first vacuum head in picking up the thermoplastic part in response to a fourth vacuum force applied at the fourth vacuum surface;
  a third arm extending between the frame and the fourth vacuum head, the third arm configured to adjustably position the fourth vacuum head relative to the first vacuum head, the fourth vacuum head being coupled to the third arm, the third arm being translatable relative to the frame in a direction parallel to the plane;
  a fifth vacuum head movably coupled to the frame, the fifth vacuum head including a fifth vacuum surface, the fifth vacuum head configured to assist the first vacuum head in picking up the thermoplastic part in response to a fifth vacuum force applied at the fifth vacuum surface; and
  a fourth arm extending between the frame and the fifth vacuum head, the fourth arm configured to adjustably position the fifth vacuum head relative to the first vacuum head, the fifth vacuum head being coupled to the fourth arm, the fourth arm being translatable relative to the frame in a direction parallel to the plane.

13. The end effector of claim 1, wherein the first vacuum surface and the second vacuum surface are coplanar.

14. A method for picking up a thermoplastic part with an end effector coupled to a robot, the end effector including a frame, a first vacuum head rigidly coupled to the frame and having a first vacuum surface, and a second vacuum head movably coupled to the frame and having a second vacuum surface oriented parallel to the first vacuum surface, the first vacuum surface having a first surface area, the second vacuum surface having a second surface area less than the first surface area, the second vacuum head being adjustably positionable relative to the first vacuum head via an arm extending between the frame and the second vacuum head, the second vacuum head being coupled to the arm, the method comprising:
  positioning the second vacuum head relative to the first vacuum head by translating the arm relative to the frame in a direction parallel to a plane defined by the first vacuum surface, wherein the translating of the arm is based on a property of the thermoplastic part, the property being at least one of a size, a shape, or a porosity of the thermoplastic part;
  positioning the first vacuum surface and the second vacuum surface against the thermoplastic part; and
  applying a first vacuum force at the first vacuum surface and a second vacuum force at the second vacuum surface, the first and second vacuum forces to respectively cause the first and second vacuum heads to pick up the thermoplastic part.

15. The method of claim 14, wherein positioning the second vacuum head relative to the first vacuum head includes translating the arm relative to the frame via a first joint of the arm.

16. The method of claim 15, wherein translating the arm relative to the frame includes actuating the arm relative to the frame via an actuator located at the first joint.

17. The method of claim 15, wherein the arm further includes a first segment, a second segment, and a second joint, wherein the first segment is movably coupled to the frame and translatable relative to the frame via the first joint, and wherein positioning the second vacuum head relative to the first vacuum head further includes rotating the second segment relative to the first segment via the second joint, the second vacuum head being coupled to the second segment.

18. The method of claim 17, wherein rotating the second segment relative to the first segment includes actuating the second segment relative to the first segment via an actuator located at the second joint.

19. The method of claim 17, wherein positioning the second vacuum head relative to the first vacuum head further includes translating the second vacuum head relative to the second segment via a third joint of the arm.

20. The method of claim 19, wherein translating the second vacuum head relative to the second segment includes actuating the second vacuum head relative to the second segment via an actuator located at the third joint.

21. The method of claim 14, wherein the first vacuum surface and the second vacuum surface are coplanar.

22. A method for forming a thermoplastic composite layup with an end effector coupled to a robot, the end effector including a frame, a first vacuum head rigidly coupled to the frame and having a first vacuum surface, and a second vacuum head movably coupled to the frame and having a second vacuum surface, the second vacuum head being adjustably positionable relative to the first vacuum head via an arm extending between the frame and the second vacuum head, the second vacuum head being coupled to the arm, the method comprising:
  positioning the second vacuum head at a first position relative to the first vacuum head by translating the arm relative to the frame in a direction parallel to a plane defined by the first vacuum surface, wherein the translating of the arm is based on a first property of a first thermoplastic part of the thermoplastic composite layup, the first property being at least one of a size, a shape, or a porosity of the first thermoplastic part;
  positioning the first vacuum surface and the second vacuum surface against the first thermoplastic part;
  picking up the first thermoplastic part with the first and second vacuum heads in response to vacuum forces applied at the first and second vacuum heads;
  placing the first thermoplastic part;
  positioning the second vacuum head at a second position relative to the first vacuum head by translating the arm relative to the frame in a direction parallel to the plane, wherein the translating of the arm is based on a second property of a second thermoplastic part of the thermoplastic composite layup, the second property being at least one of a size, a shape, or a porosity of the second thermoplastic part, the second position being different from the first position;
  positioning the first vacuum surface and the second vacuum surface against the second thermoplastic part;
  picking up the second thermoplastic part with the first and second vacuum heads in response to vacuum forces applied at the first and second vacuum heads; and placing the second thermoplastic part against the first thermoplastic part.

23. The method of claim 22, wherein the second vacuum surface is oriented parallel to the first vacuum surface.

24. The method of claim 22, wherein the first vacuum surface and the second vacuum surface are coplanar.

25. An end effector to be coupled to a robot, the end effector comprising:
a frame;
a first vacuum head rigidly coupled to the frame, the first vacuum head including a first vacuum surface, the first vacuum head configured to pick up a thermoplastic part in response to a first vacuum force applied at the first vacuum surface;
a second vacuum head movably coupled to the frame, the second vacuum head including a second vacuum surface, the second vacuum head configured to assist the first vacuum head in picking up the thermoplastic part in response to a second vacuum force applied at the second vacuum surface;
an arm extending between the frame and the second vacuum head, the arm configured to adjustably position the second vacuum head relative to the first vacuum head, the second vacuum head being coupled to the arm, the arm being translatable relative to the frame in a direction parallel to a plane defined by the first vacuum surface; and
wherein the first vacuum head further includes a pocket formed peripherally relative to the first vacuum head, the pocket being shaped to slidably receive the second vacuum head in a direction parallel to the plane, wherein the second vacuum head is configured to be positioned within the pocket when the first vacuum head and the second vacuum head are to pick up a first thermoplastic part having a first property, and wherein the second vacuum head is configured to be positioned away from the pocket when the first vacuum head and the second vacuum head are to pick up a second thermoplastic part having a second property that differs from the first property.

26. An end effector to be coupled to a robot, the end effector comprising:
a frame;
a first vacuum head rigidly coupled to the frame, the first vacuum head including a first vacuum surface, the first vacuum head configured to pick up a thermoplastic part in response to a first vacuum force applied at the first vacuum surface;
a second vacuum head movably coupled to the frame, the second vacuum head including a second vacuum surface, the second vacuum head configured to assist the first vacuum head in picking up the thermoplastic part in response to a second vacuum force applied at the second vacuum surface; and
an arm extending between the frame and the second vacuum head, the arm configured to adjustably position the second vacuum head relative to the first vacuum head, the second vacuum head being coupled to the arm, the arm being translatable relative to the frame in a direction parallel to a plane defined by the first vacuum surface, the arm including a first segment, a first joint, a second segment, and a second joint, the first segment being movably coupled to the frame and translatable relative to the frame via the first joint, the second segment being movably coupled to the first segment and rotatable relative to the first segment via the second joint.

27. An end effector to be coupled to a robot, the end effector comprising:
a frame;
a first vacuum head centrally located relative to the frame and rigidly coupled to the frame, the first vacuum head including a first vacuum surface, the first vacuum head configured to pick up a thermoplastic part in response to a first vacuum force applied at the first vacuum surface;
a second vacuum head peripherally located relative to the first vacuum head and movably coupled to the frame, the second vacuum head including a second vacuum surface, the second vacuum head configured to assist the first vacuum head in picking up the thermoplastic part in response to a second vacuum force applied at the second vacuum surface;
a third vacuum head peripherally located relative to the first vacuum head and movably coupled to the frame, the third vacuum head including a third vacuum surface, the third vacuum head configured to assist the first vacuum head in picking up the thermoplastic part in response to a third vacuum force applied at the third vacuum surface;
a fourth vacuum head peripherally located relative to the first vacuum head and movably coupled to the frame, the fourth vacuum head including a fourth vacuum surface, the fourth vacuum head configured to assist the first vacuum head in picking up the thermoplastic part in response to a fourth vacuum force applied at the fourth vacuum surface;
a fifth vacuum head peripherally located relative to the first vacuum head and movably coupled to the frame, the fifth vacuum head including a fifth vacuum surface, the fifth vacuum head configured to assist the first vacuum head in picking up the thermoplastic part in response to a fifth vacuum force applied at the fifth vacuum surface;
a first arm extending between the frame and the second vacuum head, the first arm configured to adjustably position the second vacuum head relative to the first vacuum head, the second vacuum head being coupled to the first arm, the first arm being translatable relative to the frame in a direction parallel to a plane defined by the first vacuum surface;
a second arm extending between the frame and the third vacuum head, the second arm configured to adjustably position the third vacuum head relative to the first vacuum head, the third vacuum head being coupled to the second arm, the second arm being translatable relative to the frame in a direction parallel to the plane;
a third arm extending between the frame and the fourth vacuum head, the third arm configured to adjustably position the fourth vacuum head relative to the first vacuum head, the fourth vacuum head being coupled to the third arm, the third arm being translatable relative to the frame in a direction parallel to the plane; and
a fourth arm extending between the frame and the fifth vacuum head, the fourth arm configured to adjustably position the fifth vacuum head relative to the first vacuum head, the fifth vacuum head being coupled to the fourth arm, the fourth arm being translatable relative to the frame in a direction parallel to the plane.

* * * * *